US010602052B2

(12) United States Patent
Eronen et al.

(10) Patent No.: US 10,602,052 B2
(45) Date of Patent: Mar. 24, 2020

(54) TRANSITION FROM DISPLAY OF FIRST CAMERA INFORMATION TO DISPLAY OF SECOND CAMERA INFORMATION

(71) Applicant: Nokia Technologies Oy, Espoo (FI)

(72) Inventors: Antti Eronen, Tampere (FI); Jussi Leppanen, Tampere (FI); Arto Lehtiniemi, Lempaala (FI); Sujeet Shyamsundar Mate, Tampere (FI); Ari-Pekka Liljeroos, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/741,301

(22) PCT Filed: Jul. 5, 2016

(86) PCT No.: PCT/FI2016/050498
§ 371 (c)(1),
(2) Date: Jan. 2, 2018

(87) PCT Pub. No.: WO2017/005982
PCT Pub. Date: Jan. 12, 2017

(65) Prior Publication Data
US 2018/0198973 A1   Jul. 12, 2018

(30) Foreign Application Priority Data
Jul. 6, 2015 (EP) ................................. 15175403

(51) Int. Cl.
*H04N 5/232* (2006.01)
*H04N 5/225* (2006.01)
*H04N 5/247* (2006.01)

(52) U.S. Cl.
CPC ....... *H04N 5/23216* (2013.01); *H04N 5/2258* (2013.01); *H04N 5/23206* (2013.01); *H04N 5/23293* (2013.01); *H04N 5/247* (2013.01)

(58) Field of Classification Search
CPC ..................... H04N 5/2258; H04N 5/23216
See application file for complete search history.

(56) References Cited

U.S. PATENT DOCUMENTS 9,360,671 B1 *   6/2016   Zhou ................... G02B 27/017
2007/0089126 A1 *   4/2007   Fritz ................... G11B 27/034
725/32

(Continued)

FOREIGN PATENT DOCUMENTS

EP   2448278 A2   5/2012
EP   2495970 A1   9/2012

*Primary Examiner* — William C Vaughn, Jr.
*Assistant Examiner* — Jerry T Jean Baptiste
(74) *Attorney, Agent, or Firm* — Harrington & Smith

(57) ABSTRACT

A method including receiving first camera information that is indicative of visual information from a first camera location, causing display of the first camera information, receiving second camera information that is indicative of visual information from a second camera location, identifying an object that is represented in the first camera information and represented in the second camera information, receiving an object selection input that designates a representation of the object from the first camera information, receiving an object movement input that is indicative of movement in relation to the object, determining that a direction of the object movement input is opposite to a direction from the first camera location to the second camera location, and causing transition from display of the first camera information to display of the second camera information is disclosed.

14 Claims, 16 Drawing Sheets

(56) References Cited

U.S. PATENT DOCUMENTS

| | | | | |
|---|---|---|---|---|
| 2012/0169882 A1* | 7/2012 | Millar | ................... | H04N 7/181 |
| | | | | 348/159 |
| 2012/0206607 A1* | 8/2012 | Morioka | ................ | H04N 5/247 |
| | | | | 348/159 |
| 2014/0192245 A1 | 7/2014 | Lee et al. | ................. | 348/333.05 |

* cited by examiner

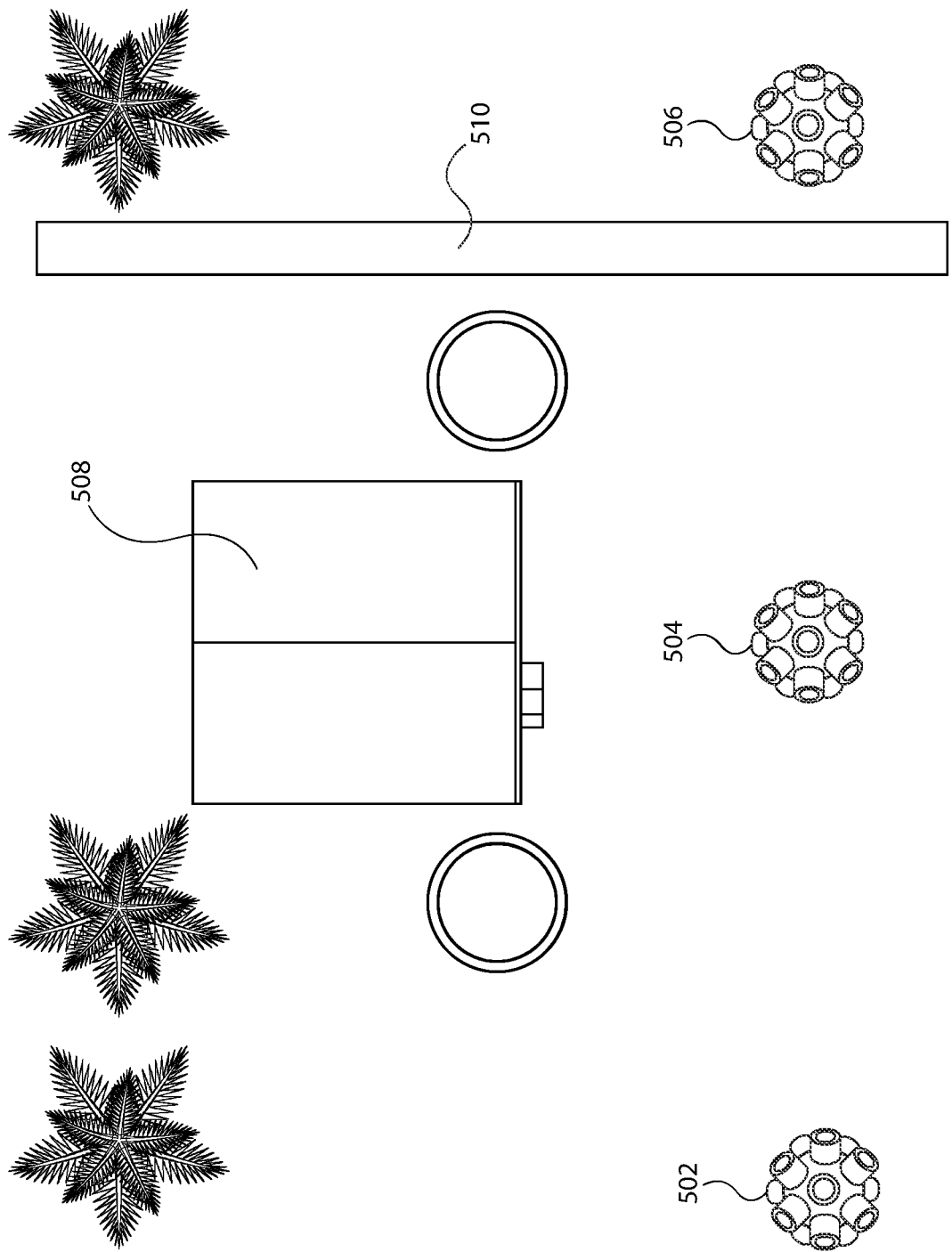

TRANSITION FROM DISPLAY OF FIRST CAMERA INFORMATION TO DISPLAY OF SECOND CAMERA INFORMATION

TECHNICAL FIELD

The present application relates generally to transition from display of first camera information to display of second camera information.

BACKGROUND

As electronic apparatuses become more pervasive, many users are increasingly using such apparatuses for purposes relating to navigation, exploration of visual information associated with geographical locations, and/or the like. As such, it may be desirable to configure an electronic apparatus such that the electronic apparatus allows a user to explore such visual information associated with geographical locations in an easy and intuitive manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for receiving first camera information that is indicative of visual information from a first camera location, causing display of the first camera information, receiving second camera information that is indicative of visual information from a second camera location, identifying an object that is represented in the first camera information and represented in the second camera information, receiving an object selection input that designates a representation of the object from the first camera information, receiving an object movement input that is indicative of movement in relation to the object, determining that a direction of the object movement input is opposite to a direction from the first camera location to the second camera location, and causing transition from display of the first camera information to display of the second camera information based, at least in part, on the determination that the direction of the object movement input corresponds with the direction from the first camera location to the second camera location.

One or more example embodiments may provide an apparatus, a computer readable medium, a computer program product, and/or a non-transitory computer readable medium having means for receiving first camera information that is indicative of visual information from a first camera location, means for causing display of the first camera information, means for receiving second camera information that is indicative of visual information from a second camera location, means for identifying an object that is represented in the first camera information and represented in the second camera information, means for receiving an object selection input that designates a representation of the object from the first camera information, means for receiving an object movement input that is indicative of movement in relation to the object, means for determining that a direction of the object movement input is opposite to a direction from the first camera location to the second camera location, and means for causing transition from display of the first camera information to display of the second camera information based, at least in part, on the determination that the direction of the object movement input corresponds with the direction from the first camera location to the second camera location.

An apparatus comprising at least one processor and at least one memory, the memory comprising machine-readable instructions, that when executed cause the apparatus to receive first camera information that is indicative of visual information from a first camera location, cause display of the first camera information, receive second camera information that is indicative of visual information from a second camera location, identify an object that is represented in the first camera information and represented in the second camera information, receive an object selection input that designates a representation of the object from the first camera information, receive an object movement input that is indicative of movement in relation to the object, determine that a direction of the object movement input is opposite to a direction from the first camera location to the second camera location, cause transition from display of the first camera information to display of the second camera information based, at least in part, on the determination that the direction of the object movement input corresponds with the direction from the first camera location to the second camera location.

In at least one example embodiment, the object movement input is at least one of a rotational input or a translational input.

In at least one example embodiment, the object movement input is a rotational input, the direction of the object movement input is a rotational input direction, and the direction from the first camera location to the second camera location is a rotational direction around the object.

In at least one example embodiment, the object movement input is a translational input, the direction of the object movement input is a translational input direction, and the direction from the first camera location to the second camera location is a translational direction from the object.

In at least one example embodiment, the object selection input is at least one of a touch input, a voice input, a cursor input, or a gesture input.

In at least one example embodiment, the object selection input designates the object that is represented by the representation of the object.

In at least one example embodiment, the object selection input shifts input focus to the representation of the object.

In at least one example embodiment, receipt of the object selection input comprises receipt of an input, and determination that the input designates the representation of the object from the first camera information.

In at least one example embodiment, the determination that the input is the object selection input comprises determining that a position of the input corresponds with a position of a representation of the object in the first camera information.

One or more example embodiments further receive a different object movement input that is indicative of movement in relation to the object, determine that a direction of the different object movement input is opposite to a direction from the second camera location to the first camera location, and cause transition from display of the second camera information to display of the first camera information based, at least in part, on the determination that the direction of the different object movement input is opposite to the direction from the second camera location to the first camera location.

In at least one example embodiment, the transition from display of the first camera information to display of the second camera information causes deselection of the object, and further comprises receipt of a different object selection input that designates a representation of the object from the second camera information;

In at least one example embodiment, the transition from display of the first camera information to display of the second camera information comprises generation of an animation that depicts a visual movement from the first camera location to the second camera location, termination of display of the first camera information, causation of rendering of the animation subsequent to termination of display of the first camera information, and causation of display of the second camera information subsequent to completion of the rendering of the animation.

One or more example embodiments further determine a speed of the object movement input.

In at least one example embodiment, speed of the rendering of the animation is proportional to the speed of the object movement input.

One or more example embodiments further determine that a magnitude of the object movement input exceeds a threshold magnitude.

In at least one example embodiment, the transition from display of the first camera information to display of the second camera information is based, at least in part, on the determination that the magnitude of the object movement input exceeds the threshold magnitude.

One or more example embodiments further determine that a magnitude of the object movement input is within a threshold magnitude, determine an intermediate location that is between the first camera location and the second camera location based, at least in part, on the magnitude of the object movement input, generate an intermediate representation of the first camera information and the second camera information, such that the intermediate representation is indicative of visual information that correlates to the intermediate location, cause display of the intermediate representation, determine that the magnitude of the object movement input has increased to an increased magnitude, and determine that the increased magnitude of the object movement input exceeds the threshold magnitude.

In at least one example embodiment, the transition from display of the first camera information to display of the second camera information is based, at least in part, on the determination that the increased magnitude of the object movement input exceeds the threshold magnitude.

In at least one example embodiment, the object movement input comprises a pause portion and a continuation portion, the pause portion being prior to the determination that the magnitude of the object movement input is within the threshold magnitude, and the continuation portion causing the determination that the magnitude of the object movement input has increased to the increased magnitude.

One or more example embodiments further receive third camera information that is indicative of visual information from a third camera location, subsequent to the transition from display of the first camera information to display of the second camera information, receive another object movement input that is indicative of movement in relation to the object, determine that a direction of the object movement input is opposite to a direction from the second camera location to the third camera location, and cause transition from display of the second camera information to display of the third camera information based, at least in part, on the determination that the direction of the object movement input corresponds with the direction from the second camera location to the third camera location.

In at least one example embodiment, the third camera information fails to comprise a representation of the object, and further comprises causation of display of an object indicator that overlays the third camera information at a position correlating with a position of the object.

One or more example embodiments further perform, in response to the identification of the object, causation of display of an object emphasis indicator such that the object emphasis indicator aligns with the representation of the object.

One or more example embodiments further receive an object emphasis activation input that enables emphasis of the object.

In at least one example embodiment, the causation of display of the object emphasis indicator is based, at least in part, on the receipt of the object emphasis activation input.

BRIEF DESCRIPTION OF THE DRAWINGS

For a more complete understanding of one or more example embodiments, reference is now made to the following descriptions taken in connection with the accompanying drawings in which:

FIGS. 5A-5C are diagrams illustrating display of an object indicator according to at least one example embodiment.

DETAILED DESCRIPTION OF THE DRAWINGS

Figure 1:
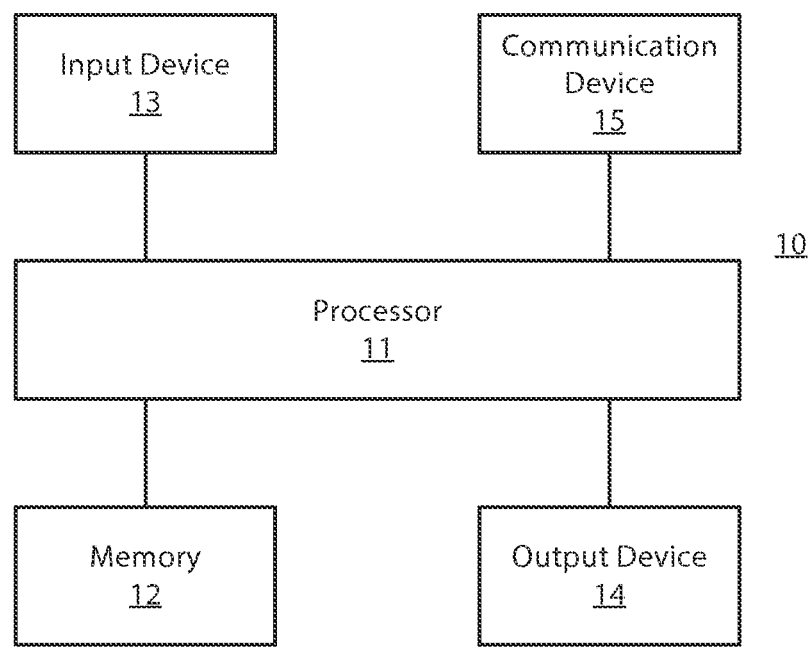
FIG. 1 is a block diagram showing an apparatus according to at least one example embodiment.

Various example embodiments and some of their potential advantages are understood by referring to FIGS. 1 through 12 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, a near eye display, a head mounted display, a virtual reality display, an augmented reality display, a wearable apparatus, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition, or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display, or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

One or more example embodiments may include a geographic database. For example, the geographic database may comprise camera information associated with FIGS. 3A-5C, navigational attributes associated with FIGS. 3A-5C, and/or the like. For example, the geographic database may include node data records, road segment or link data records, point of interest (POI) data records, perspective image data records, video content data records, and other data records. More, fewer or different data records may be provided. In at least one example embodiment, the other data records include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI, event data, or recorded route information may be matched with respective map or geographic records via position or GPS data associations (such as using known or future map matching or geo-coding techniques), for example.

In at least one example embodiment, the road segment data records are links or segments representing roads, streets, or paths, as may be used in the calculated route or recorded route information for determination of one or more personalized routes. The node data records may be end points corresponding to the respective links or segments of the road segment data records. The road link data records and the node data records may represent a road network, such as used by vehicles, cars, and/or other entities. Alternatively, the geographic database may contain path segment and node data records or other data that represent pedestrian paths or areas in addition to or instead of the vehicle road record data, for example.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database may include data about the POIs and their respective locations in the POI data records. The geographic database may also include data about places, such as cities, towns, or other communities, and other geographic features, such as bodies of water, mountain ranges, etc. Such place or feature data may be part of the POI data or may be associated with POIs or POI data records (such as a data point used for displaying or representing a position of a city). In addition, the geographic database may include and/or be associated with event data (e.g., traffic incidents, constructions, scheduled events, unscheduled events, etc.) associated with the POI data records or other records of the geographic database.

The geographic database may be maintained by a content provider (e.g., a map developer) in association with a services platform. By way of example, the map developer may collect geographic data to generate and enhance the geographic database. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used.

The geographic database may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation apparatuses or systems.

Geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation apparatus, such as by an end user apparatus, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation apparatus developer or other end user apparatus developer, may perform compilation on a received geographic database in a delivery format to produce one or more compiled navigation databases.

As mentioned above, a server side geographic database may be a master geographic database, but in alternate embodiments, a client side geographic database may represent a compiled navigation database that may be used in or with an end user apparatus to provide navigation and/or map-related functions. For example, the geographic database may be used with an end user apparatus to provide an end user with navigation features. In such an example, the geographic database may be downloaded or stored on the end user apparatus, such as in one or more applications, or the end user apparatus may access the geographic database through a wireless or wired connection (such as via a server and/or a communication network), for example.

In at least one example embodiment, the end user apparatus is one of an in-vehicle navigation system, a personal navigation device (PND)/personal navigation apparatus, a portable navigation device/portable navigation apparatus, a cellular telephone, a mobile phone, a personal digital assistant (PDA), a watch, a camera, a computer, and/or other apparatuses that may perform navigation-related functions, such as digital routing and map display. In at least one example embodiment, the navigation apparatus is a cellular telephone. An end user may use the end user apparatus for navigation and map functions such as guidance and map display, for example, and for determination of one or more personalized routes or route segments based, at least in part, on one or more calculated and recorded routes, according to exemplary embodiments.

Figure 2A:
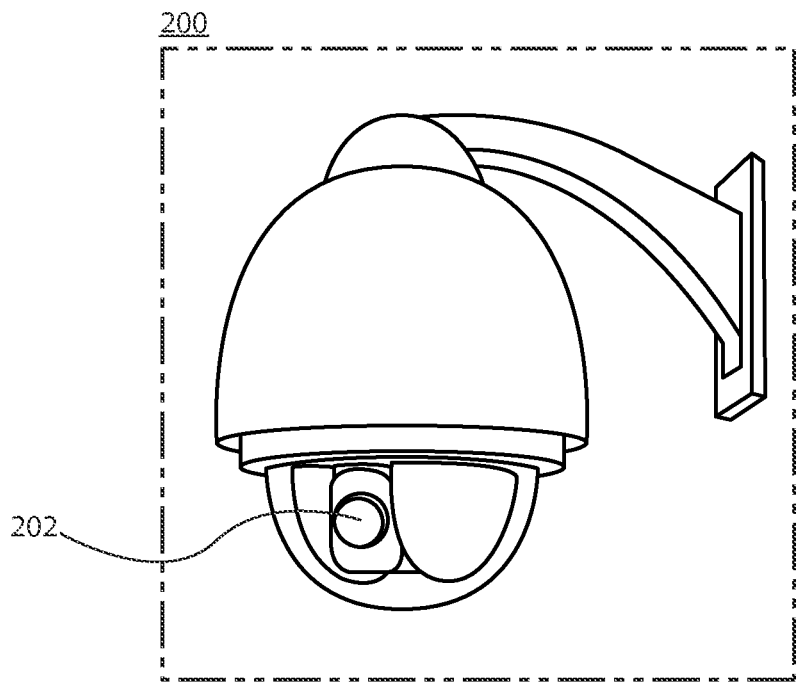
FIGS. 2A-2B are diagrams illustrating camera modules according to at least one example embodiment.
Figure 2B:
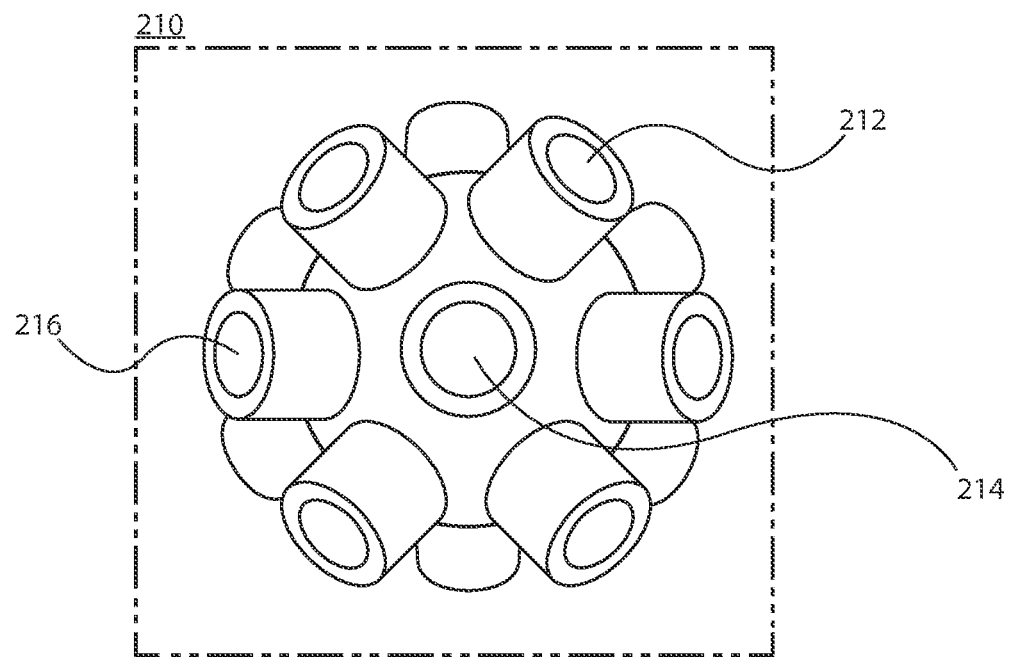

FIGS. 2A-2B are diagrams illustrating camera modules according to at least one example embodiment. The examples of FIGS. 2A-2B are merely examples and do not limit the scope of the claims. For example, camera module design may vary, camera module configuration may vary, and/or the like.

In some circumstances, it may be desirable to capture visual information that depicts a view from a geographical location. For example, users commonly explore geographical locations using an electronic apparatus by way of exploring street-level imagery, viewing video content that was captured at various geographical locations, and/or the like. As geographical databases, map information, and similar geographical-related repositories become increasingly inclusive and granular, it may be desirable to provide a user with an intuitive manner in which to browse such visual information, an easy manner in which to identify that visual information captured at a particular geographical location is available, and/or the like. Such visual information may be captured by a separate apparatus, such as an apparatus comprising one or more camera modules. The separate apparatus may be a user apparatus that was temporarily located at a geographical location and captured visual information from the geographical location, a video capture apparatus that is permanently fixed to an object at a geographical location and continuously streams visual information from the geographical location, and/or the like.

FIG. 2A is a diagram illustrating a camera module according to at least one example embodiment. The example of FIG. 2A depicts apparatus 200 that comprises camera module 202. As can be seen, apparatus 200 is configured to be attached to an object, such as a post, a wall, a vehicle, an aerial drone, an aircraft, and/or the like, and comprises a tilt-pan mechanism that allows movement of camera module 202. Camera module 202 may capture visual information within a field of view of camera module 202 such that the visual information depicts a portion of the environment surrounding the apparatus, depicts a single view from the geographical location at which the apparatus is located, and/or the like.

In recent times, panoramic visual information has become increasingly pervasive. Such panoramic visual information comprises depicts a larger portion of an environment surrounding an apparatus, provides a user with an ability to pan around the entirety of a scene captured by the apparatus, and/or the like.

FIG. 2B is a diagram illustrating a camera module according to at least one example embodiment. The example of FIG. 2B depicts apparatus 210 that comprises a plurality of camera modules, including camera modules 212, 214, and 216. As can be seen, apparatus 210 is configured to be attached to an object, such as a post, a wall, a vehicle, an aerial drone, an aircraft, etc., hang from an object, such as a light fixture, signal light, etc., and/or the like. As can be seen, each camera module of the plurality of camera modules is arranged such that the plurality of camera modules may capture visual information associated with a majority, an entirety, and/or the like of the environment surrounding the apparatus. For example, each of camera modules 212, 214, and 216 may capture visual information within a field of view of the respective camera module such that the aggregate visual information, together with the other camera modules, depicts a majority, an entirety, and/or the like of the environment surrounding the apparatus, depicts a plurality of views from the geographical location at which the apparatus is located, and/or the like.

FIGS. 3A-3E are diagrams illustrating camera locations according to at least one example embodiment. The examples of FIGS. 3A-3E are merely examples and do not limit the scope of the claims. For example, the camera information may vary, the camera locations may vary, the number of cameras may vary, and/or the like.

As previously described, in some circumstances, it may be desirable to capture visual information that depicts a view from a geographical location, an environment, and/or the like. In some circumstances, it may be desirable to capture visual information from multiple views of a geographical location, an environment, and/or the like. For example, a user of an apparatus may wish to view a geographical location that is remote to the apparatus by way of the apparatus. For example, the user may wish to explore the environment of the geographical location, observe an event occurring at the geographical location, and/or the like. To facilitate such interactions, it may be desirable to configure an apparatus such that the apparatus may display visual information captured from the geographical location. In such an example, the user may wish to view the geographical location from more than one perspective, to compare different perspectives of the geographical location, and/or the like. For example, a portion of a geographical location may be obstructed from a particular perspective, but may be visible from a different perspective. In circumstances such as these, it may be desirable to configure a plurality of cameras such that each camera may capture a different perspective of the geographical location, to capture different perspectives of a geographical region from a single camera placed at different locations at different points in time, and/or the like. In this manner, an apparatus may receive camera information from camera locations associated with the cameras. Camera information may refer to information associated with a camera module. For example, camera information may comprise visual information captured by a camera module, a portion of visual information captured by a camera module, information indicative of visual information (e.g. a storage location of the visual information, information on how to connect to a live visual feed from a camera module, and/or the like), metadata associated with visual information (e.g. an angle of a camera module, the camera module location, supplementary information, and/or the like), and/or the like. In at least one example embodiment, an apparatus receives camera information that is indicative of visual information from a camera location. A camera location may refer to the physical location of a camera module within a geographical location, an environment, and/or the like. For example, a camera location may be associated with a particular set of geographic coordinates, a particular region of a room, and/or the like.

Figure 3A:
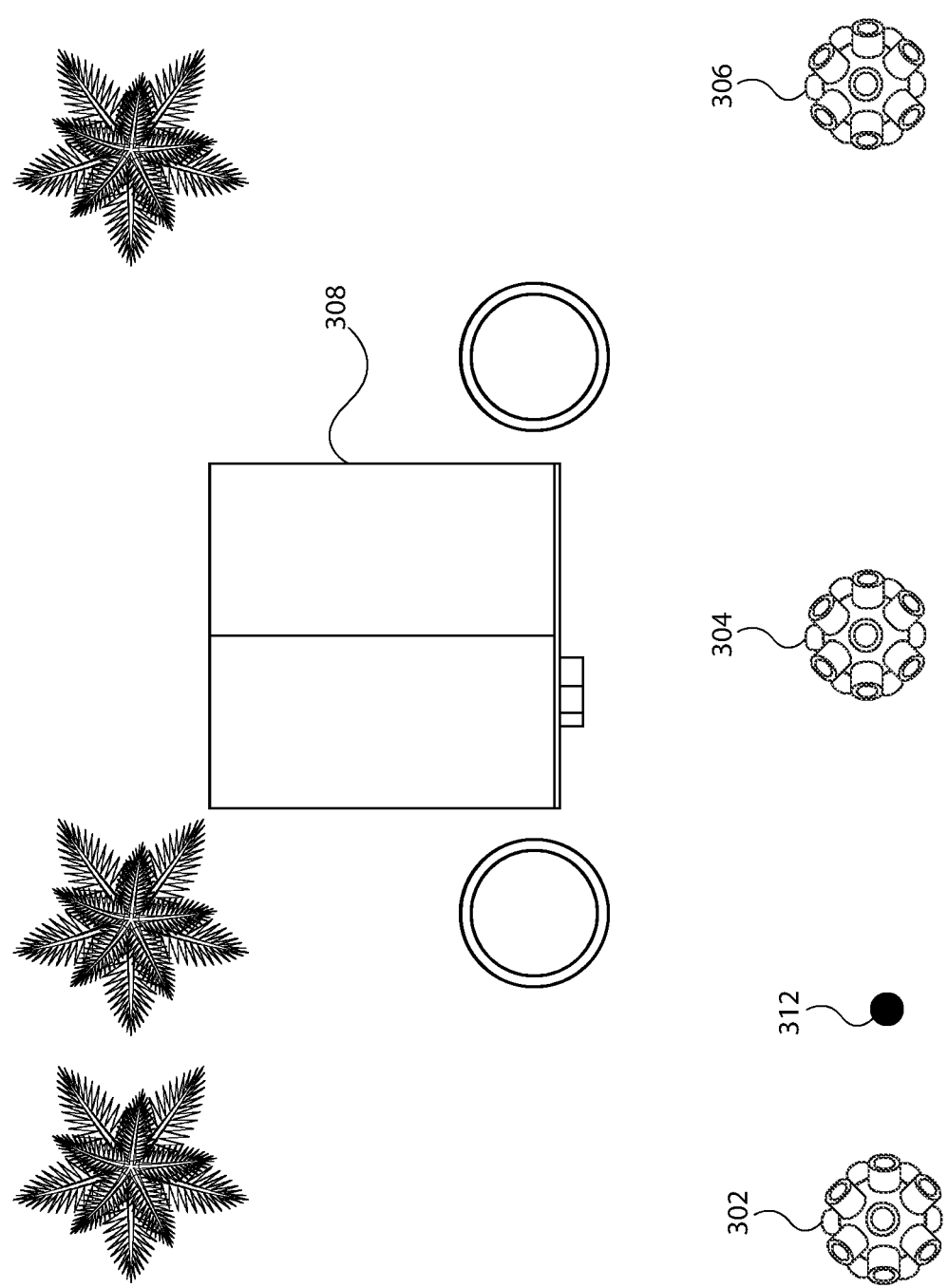
FIGS. 3A-3E are diagrams illustrating camera locations according to at least one example embodiment.

The example of FIG. 3A illustrates a top down view of an environment. The environment illustrated in the example of FIG. 3A comprises first camera module 302, second camera module 304, third camera module 306, object 308, and location 312. In the example of FIG. 3A, camera modules s 302, 304, and 306 may be similar as described regarding FIGS. 2A-2B. It can be seen that in the example of FIG. 3A, object 308 is a building comprising a main structure and two side chimneys adjacent to a plurality of trees. Even though object 308 is illustrated as a building in the example of FIG. 3A, it should be understood that an object 308 may be any object within a field of view of a camera module. It can be seen that in the example of FIG. 3A, location 312 is a location that is between the camera location of camera module 302 and the camera location of camera module 304.

Figure 3B:
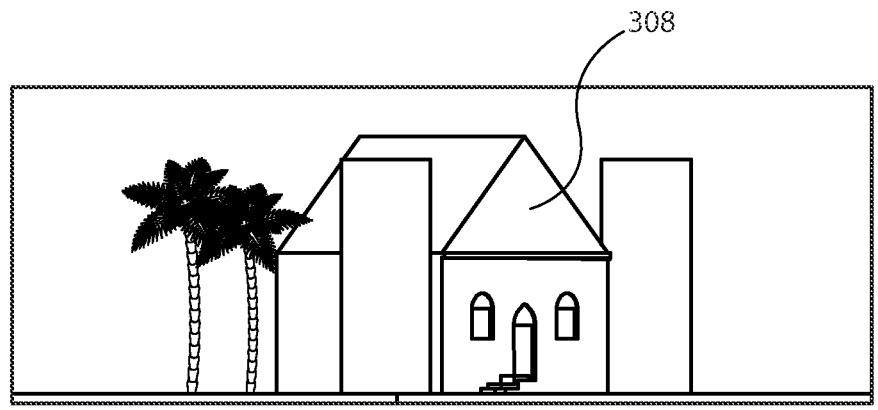
Figure 3C:
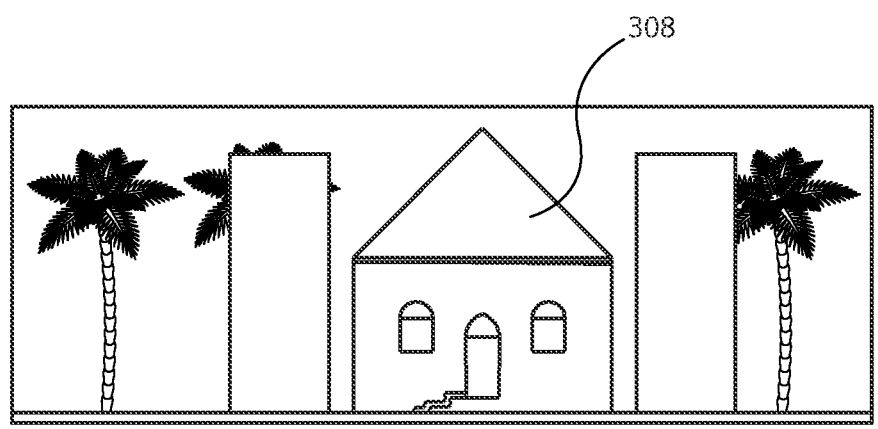
Figure 3D:
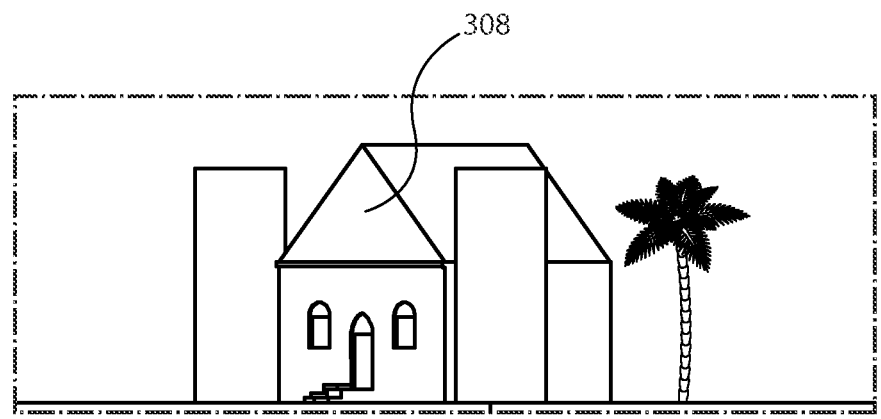
Figure 3E:
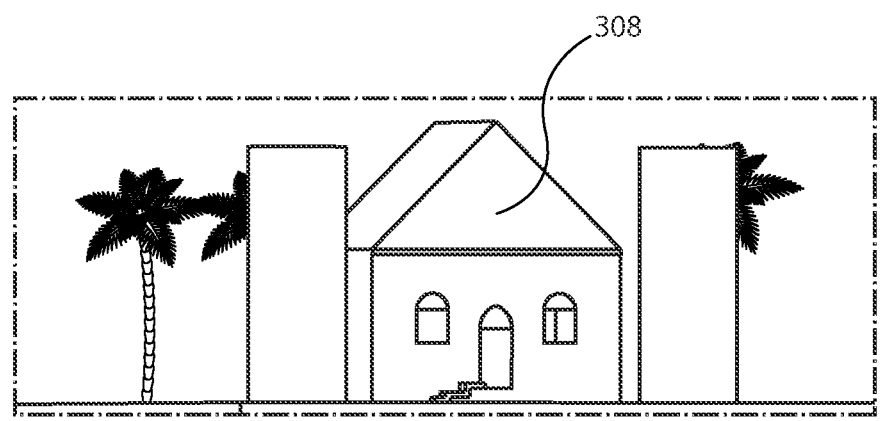

In some circumstances, a particular view of an object within an environment may be unavailable to a camera module within the environment. For example, a camera module may fail to be located at a location within the environment such that the particular view is within the field of view of a camera module. The example of FIG. 3B illustrates a view of object 308 from the camera location of camera module 302 of FIG. 3A. In this manner, FIG. 3B may illustrate a field of view of camera module 302. The example of FIG. 3C illustrates a view of object 308 from the camera location of camera module 304 of FIG. 3A. In this manner, FIG. 3C may illustrate a field of view of camera module 304. It can be seen that in the example of FIG. 3C, portions of the environment are visible that are obstructed in the example of FIG. 3B. For example, the tree to the right of object 308 is not visible in the example of FIG. 3B. The example of FIG. 3D illustrates a view of object 308 from the camera location of camera module 306 of FIG. 3A. In this manner, FIG. 3D may illustrate a field of view of camera module 306. It can be seen that in the example of FIG. 3D, portions of the environment are visible that are obstructed in the example of FIG. 3B. For example, the right side of object 308 is not visible in the example of FIG. 3B. The example of FIG. 3E illustrates a view of object 308 from location 312 of FIG. 3A. In this manner, FIG. 3E may illustrate a view from a location between camera modules 302 and 304 of FIG. 3A. It can be seen that in the example of FIG. 3E, the environment is illustrated from a different perspective than the examples of FIGS. 3B and 3C, showing elements visible in both. For example, the left side of object 308 and a portion of the tree to the right of object 308 are visible.

As previously described, in some circumstances a user of an apparatus may wish to view a geographical location that is remote to the apparatus by way of the apparatus. For example, the user may wish to explore the environment of the geographical location, observe an event occurring at the geographical location, and/or the like. To facilitate such interactions, it may be desirable to configure an apparatus such that the apparatus may display visual information captured from the geographical location. In circumstances such as these, it may be desirable for the apparatus to cause display of camera information. For example, a user may wish to view object 308 of FIGS. 3A-3E as seen from the camera location of camera module 302. In such an example, the apparatus may cause display of camera information that comprises visual information that represents the view of object 308, as depicted in the example of FIG. 3B. In another example, a user may wish to view object 308 of FIGS. 3A-3E as seen from the camera location of camera module 304. In such an example, the apparatus may cause display of camera information that comprises visual information that represents the view of object 308, as depicted in the example of FIG. 3C. In at least one example embodiment, an apparatus causes display of camera information. For example, an apparatus may display camera information on a display, send camera information to a separate apparatus for display such that the separate apparatus displays the camera information, and/or the like.

In some circumstances a user may wish to transition the display of camera information to display of different camera information. For example, an apparatus may receive first camera information from a first camera module and second camera information from a second camera module. In such an example, the apparatus may be unable to display first camera information and second camera information simultaneously, the user may not desire to view first and second camera information simultaneously, and/or the like. In such circumstances, the user may desire to view the second camera information while the first camera information is currently being displayed. In at least one example embodiment, an apparatus causes transition from display of first camera information to display of second camera information. For example, an apparatus may transition from display of camera information comprising visual information representative of the view of object 308 in the example of FIG. 3B to display of camera information representative of the view of object 308 in the example of FIG. 3C.

In some circumstances a user may wish to transition the display of at least a portion of camera information to display of at least a portion of different camera information. For example, an apparatus may receive first camera information from a first camera module and second camera information from a second camera module. In such an example, the user may wish to see a portion of the second camera information superimposed over the first camera information, see a portion of the first camera information superimposed over the second camera information, and/or the like. For example, the user may wish to see an alternative angle of an object comprised by the first camera information while continuing to view the environment around the object as represented in the first camera information, may wish to view an alternative view of an environment surrounding an object while continuing to view the object as represented in the first camera information, and/or the like. For example the second camera information may comprise an alternative angle of the object, an alternative angle of the environment, and/or the like. In circumstances such as these, an apparatus may transition from display of a portion of first camera information to display of a portion of second camera information. For example, an apparatus may transition from display of camera information comprising visual information representative of the view of object 308 and the environment surrounding object 308 in the example of FIG. 3B, to display of camera information representative of the view of object 308 in the example of FIG. 3C superimposed over the background environment surrounding object 308 in the example of FIG. 3B. In this manner, the user may view the environment of FIG. 3B simultaneously with the view of object 308 in the example of FIG. 3C. In another example, an apparatus may transition from display of camera information comprising visual information representative of the view of object 308 and the environment surrounding object 308 in the example of FIG. 3B, to display of camera information representative of the view of object 308 in the example of FIG. 3B superimposed over the background environment surrounding object 308 in the example of FIG. 3C. In this manner, the user may view the environment of FIG. 3C simultaneously with the view of object 308 in the example of FIG. 3B.

In some circumstances, it may be desirable for an apparatus to identify an object that is represented in camera information. For example, the object may be used to determine a location of the camera information, to classify the camera information, to associate the camera information with other information, the object may be selectable by a user of the apparatus (e.g. as an input to an apparatus function), and/or the like. In some circumstances, an object may be represented in camera information associated with different camera modules. For example, a first camera module and a second camera module may have different views of the same object. In at least one example embodiment, an apparatus identifies an object that is represented in first camera information and represented in second camera information. For example an apparatus may identify object 308 of FIGS. 3A-3E. It can be seen that object 308 may be represented in camera information associated with camera modules 302, 304, and 306 of FIG. 3A. Object detection may be performed in a number of manners. For example, an apparatus may utilize computer vision technology, image processing, manual input from an individual, and/or the like to identify an object.

In some circumstances, camera information may be associated with a particular direction, orientation, and/or the like in relation to the orientation of a display. For example, camera information may be used to generate imagery for a virtual environment. For instance, a user observing the virtual environment (e.g. by way of a near eye display, a tablet, and/or the like) may perceive camera information displayed on a display to be associated with a particular direction. In circumstances such as these, it may be desirable to transition the display of first camera information to display of second camera information in relation to a reference point. For example, it may be desirable to transition from the display of first camera information to display of second camera information in relation to an object that is represented in the first camera information and represented in the second camera information. In this manner, the user may perceive the second camera information as originating from a camera location in a particular direction, orientation, and/or the like from the camera location associated with the first camera information with respect to the object. For example, a user may perceive camera information comprising visual information representative of the view of object 308 in the example of FIG. 3B as originating from the camera location of camera module 302 of FIG. 3A, and may perceive camera information comprising visual information representative of the view of object 308 in the example of FIG. 3B as having a particular orientation, direction, and/or the like from the camera location of camera module 302 with respect to object 308.

In circumstances such as these, it may be desirable for the user to designate an object represented by the camera information by way of an object selection input. An object selection input may refer to an input that designates an object that is represented by a representation of an object, shifts input focus to an object, and/or the like. For example, an apparatus may transition from the display of first camera information to display of second camera information in relation to a designated object. In at least one example embodiment, an apparatus receives object selection input that designates a representation of an object in camera information. For example, an apparatus may receive a touch input, a hover input, a voice input, a cursor input, a gesture input, a gaze input, a head tracking input, and/or the like, and determine that the input is an object selection input that designates for example, a representation of object 308 of FIGS. 3A-3E from camera information comprising a representation of the view of FIG. 3B. The determination that the input is an object selection input may comprise determining that a position of the input corresponds with a position of a representation of an object in the camera information. For example, if the input fails to correlate with a position of a representation of an object in the camera information, object has failed to have been selected, and the apparatus may fail to designate an object in response to the input. In at least one example embodiment, an object selection input is at least one of a touch input, a hover input, a voice input, a cursor input, or a gesture input.

In some circumstances, it may be desirable to select a different object. For example, a user may be viewing different camera information after a transition from display from first camera information to display of second camera information. The second camera information may comprise a representation of an object that fails to be comprised by the first camera information, and the user may wish to select the object. In at least one example embodiment, the transition from display of the first camera information to display of the second camera information causes deselection of an object. In this manner, the apparatus may receive a different object selection input that designates a representation of an object from the second camera information.

In some circumstances, a user may wish to view particular camera information in relation to a reference point. For example, a user may be viewing first camera information comprising a representation of a particular object, and the user may wish to view second camera information originating from a different camera location having a particular direction with respect to the object and the first camera information. For example, a user may be viewing camera information comprising visual information representative of the view of object 308 in the example of FIG. 3B, and may wish to view camera information comprising visual information representative of the view of object 308 in the example of FIG. 3C. It can be seen that view of object 308 in the example of FIG. 3C is rightward of the view of object 308 illustrated in FIG. 3B with respect to object 308, and that the view of object 308 has clockwise rotated perspective from FIG. 3B. In circumstances such as these, it may be desirable for an apparatus to receive an object movement input. An object movement input may refer to an input that is indicative of a movement in relation to an object. For example, an object movement may be a rotational input, a drag input, a translational input, and/or the like with respect to an object. In at least one example embodiment, an apparatus receives an object movement input that is indicative of movement in relation to an object. For example, an apparatus may receive a rotational input with respect object 308 of FIGS. 3A-3E.

As previously described, an object movement input may be a rotational input. A rotational input may refer to an object movement input a comprising rotational input direction around an object. For example, a user may use a "grab" gesture as an object selection input, and may perform a rotation around the "grabbed object" in a clockwise direction or a counterclockwise direction by rotation of the hand, twirling of the fingers, and/or the like in the clockwise or counterclockwise direction to indicate a desire to view camera information that is clockwise or counterclockwise with respect to a rotation around an object. For example, if a user is viewing a representation of object 308 of FIG. 3A from the perspective of camera module 304, a user may perform a counterclockwise rotational input with respect to object 308 to indicate a desire to view a representation of object 308 from the perspective of camera module 302. In at least one example embodiment, an apparatus determines that a direction of an object movement input is opposite to a direction from a first camera location to a second camera location. In at least one example embodiment, an object movement input is a rotational input, the direction of the object movement input is a rotational input direction, and the direction from the a camera location to a second camera location is a rotational direction around the object.

As previously described, an object movement input may be a translational input. A translational input may refer to an object movement input comprising a translational input direction with respect to an object. For example, a user may use a "grab" gesture as an object selection input, and may perform a translation input with respect to the "grabbed object" in a leftward, rightward, forward, backward, and/or the like direction to indicate a desire to view camera information that is leftward, rightward, forward, backward, and/or the like with respect to the object. For example, if a user is viewing a representation of object 308 of FIG. 3A from the perspective of camera module 304, a user may perform a leftward translational input with respect to object 308 to indicate a desire to view a representation of object 308 from the perspective of camera module 302. In at least one example embodiment, an object movement input is a translational input, the direction of the object movement input is a translational input direction, and the direction from a first camera location to a second camera location is a translational direction from the object.

In some circumstances, the gaze of a user may be tracked. For example, a head mounted display may track the viewing angle of a user, the position of the user's head, and/or the like. Such information may be used to select camera information. For example, a user may rotate his head clockwise to select a camera location leftward of the viewer, may tilt his head upward to select a camera location below the viewer, and/or the like.

In some circumstances, it may be desirable to determine the magnitude of an object movement input. For example, an apparatus may refrain from transitioning between display of first camera information and display of second camera information if the object movement is below a threshold, may transition from display second camera information to third camera information if the magnitude exceeds a threshold, and/or the like. In this manner, a user may avoid entering unintended object movement inputs, may have more granular control over selection of camera information, and/or the like. In at least one example embodiment, an apparatus determines that a magnitude of an object movement input exceeds a threshold magnitude. A threshold magnitude may refer to a magnitude of movement which may trigger an apparatus to perform a function in circumstances where the magnitude of the movement exceeds the threshold magnitude. For example, the object movement input may be a gesture comprising a rotation of a user's hand, and the rotation may be tracked by a gesture recognition system. The gesture recognition system may track the magnitude of the hand rotation (e.g. in degrees, radians, and/or the like). In such an example, if the threshold magnitude is for instance, 10 degrees, the apparatus may transition from display of first camera information to display of second camera information if the hand rotates beyond 10 degrees. In another example, the object movement input may be a gesture comprising a translational movement of a user's hand, and the distance of the translational movement may be tracked by a gesture recognition system. The gesture recognition system may track the magnitude of the translation (e.g. in inches, millimeters, and/or the like). In such an example, if the threshold magnitude is for instance, 50 millimeters, the apparatus may transition from display of first camera information to display of second camera information if the hand translates beyond 50 millimeters in the same direction. In this manner, a transition from display of first camera information to display of second camera information may be based, at least in part, on the determination that the magnitude of the object movement input exceeds the threshold magnitude.

In at least one example embodiment, an apparatus determines that a magnitude of an object movement input is within a threshold magnitude. In this manner, the apparatus may preclude transition from display of first camera information to display of second camera information while the magnitude is within the threshold magnitude. In at least one example embodiment, an apparatus determines that a magnitude of an object movement input has increased to an increased magnitude, and determine that the increased magnitude of the object movement input exceeds the threshold magnitude. In this manner, a transition from display of first camera information to display of the second camera information may be based, at least in part, on the determination that the increased magnitude of the object movement input exceeds the threshold magnitude.

In some circumstances, a user may pause while entering an object movement. In such circumstances, the user may resume the object movement input at a later time. In at least one example embodiment, an object movement input comprises a pause portion and a continuation portion, the pause portion being prior to a determination that the magnitude of an object movement input is within the threshold magnitude, and the continuation portion causing a determination that the magnitude of the object movement input has increased to the increased magnitude.

Figure 4A:
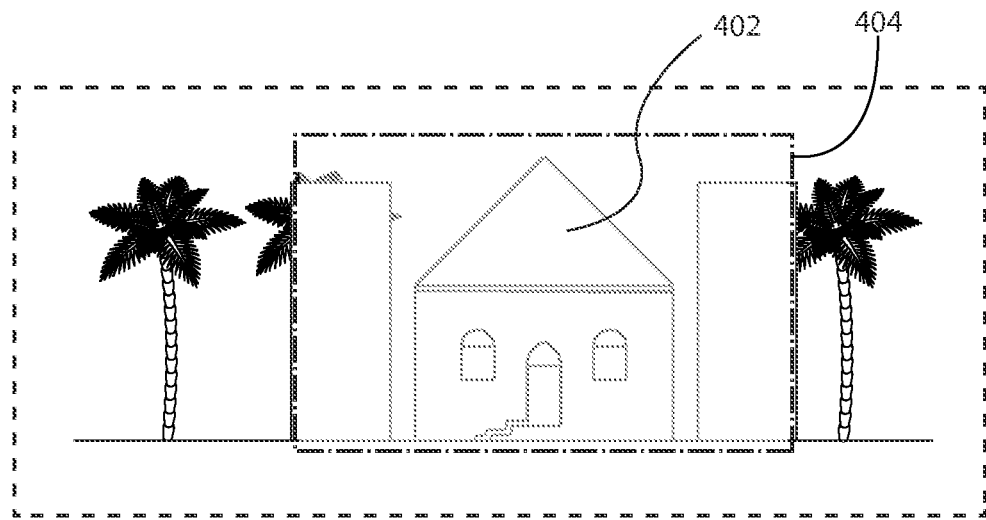
FIGS. 4A-4B are diagrams illustrating display of an object emphasis indicator according to at least one example embodiment.
Figure 4B:
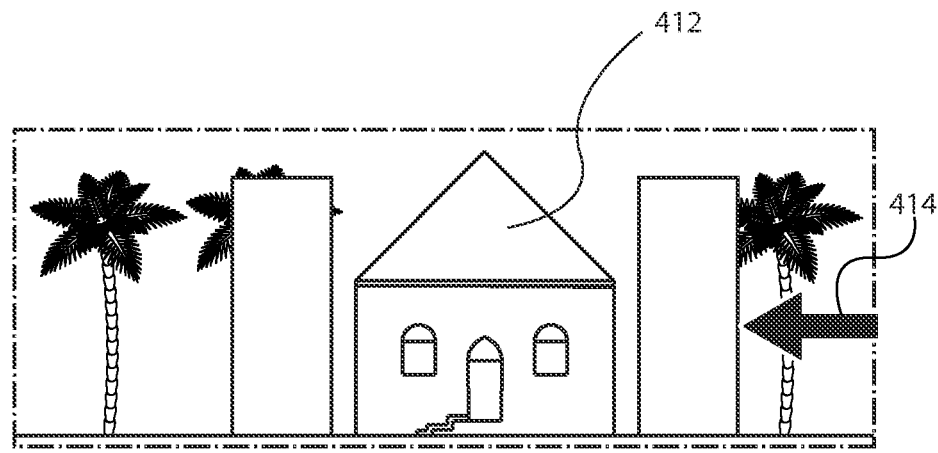

FIGS. 4A-4B are diagrams illustrating display of an object emphasis indicator according to at least one example embodiment. The examples of FIGS. 4A-4B are merely examples and do not limit the scope of the claims. For example, the size of the indicator may vary, the shape of the indicator may vary, the display location of the indicator may vary, and/or the like.

In some circumstances, it may be desirable to emphasize a representation of an object while the representation is displayed. For instance, the object represented by the representation may be an object selectable by a user, the object may be associated with feature of the apparatus, the apparatus may have identified the object represented by the representation, and/or the like. For example, the object may be user designable by way of an object selection input. In circumstances such as these, it may be desirable to cause display of an object emphasis indicator. An object emphasis indicator may refer to a visual representation that aligns with a representation of an object. In this manner, the object emphasis indicator may draw the user's attention to the representation of the object. For example, an object emphasis indicator may be a graphical highlight superimposed over the representation of the object, a symbol displayed near the representation of the representation of the object, and/or the like. In at least one example embodiment, an apparatus causes display of an object emphasis indicator such that the object emphasis indicator aligns with the representation of the object. As previously described, in some circumstances an apparatus may identify an object. In at least one example embodiment, causation of display of an object emphasis indicator is performed in response to an identification of an object.

The example of FIG. 4A illustrates display of representation 402 of an object. It can be seen that representation 402 is represented as a building adjacent to a plurality of trees. It can be seen that in the example of FIG. 4A, representation 402 is superimposed by a graphical highlight 404. In this manner graphical highlight 404 may be an object emphasis indicator. For example, graphical highlight 404 may draw a user's attention away from the trees illustrated in FIG. 4A, and draw the user's attention towards representation 402.

The example of FIG. 4B illustrates display of representation 412 of an object. It can be seen that representation 412 is represented as a building adjacent to a plurality of trees. It can be seen that in the example of FIG. 4B, symbol 414 is displayed near representation 412. In this manner symbol 414 may be an object emphasis indicator. For example, symbol 414 may draw a user's attention away from the trees illustrated in FIG. 4B, and draw the user's attention towards representation 412.

In some circumstances, a user may desire for display of an object emphasis indicator to be optional. For example, the user may find that object emphasis indicators are distracting, the object emphasis indicator may clutter the display, and/or the like. In circumstances such as these, it may be desirable to configure the apparatus to limit display of object emphasis indicators to particular circumstances. For example, the apparatus may be configured to cause display of object emphasis indicator in response to an object emphasis activation input. An object emphasis activation input may refer to an input that enables emphasis of an object. For example, an object emphasis activation input may be a menu setting on the apparatus, a particular gesture performed by the user, and/or he like. In at least one example embodiment, an apparatus receives an object emphasis activation input that enables emphasis of the object.

Figure 5B:
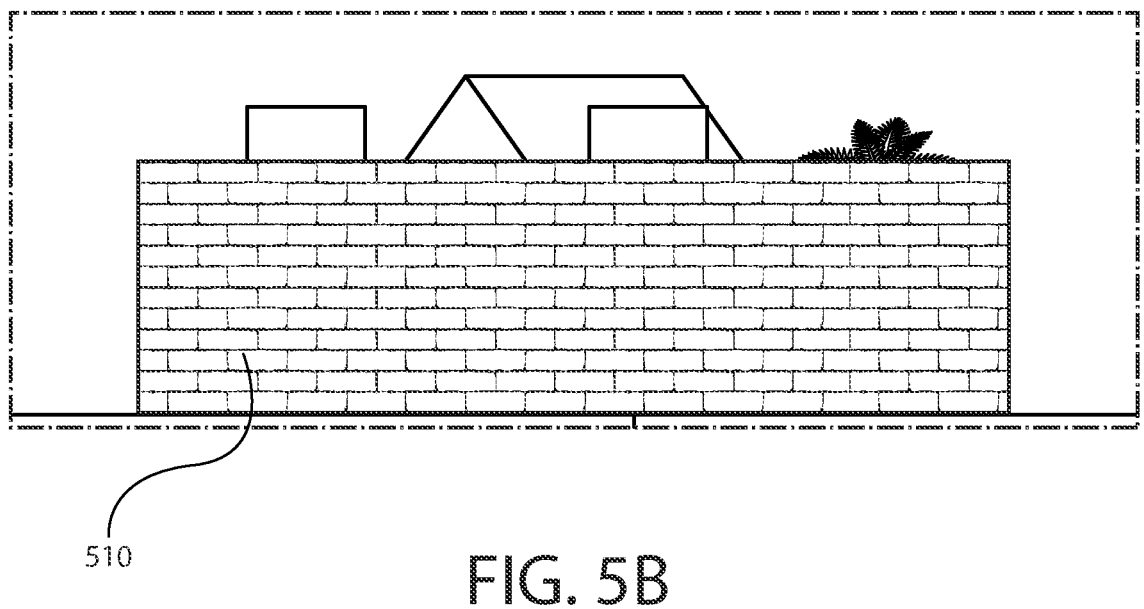
Figure 5C:
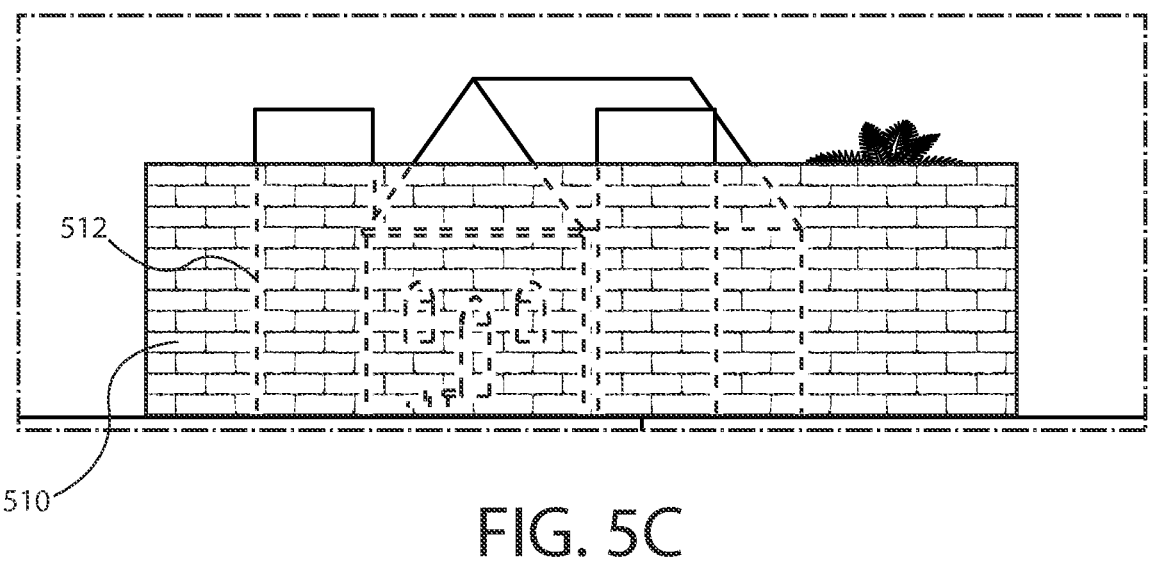

FIGS. 5A-5C are diagrams illustrating display of an object indicator according to at least one example embodiment. The examples of FIGS. 5A-5C are merely examples and do not limit the scope of the claims. For example, the style of the object indicator may vary, the location of the object may vary, the camera information may vary, and/or the like.

In some circumstances, the view of an object in an environment from a particular location may be obstructed. For example, a camera may be unable to view objects that are obstructed by other objects, behind a barrier, in an adjacent room, and/or the like. In circumstances such as these, a camera module may fail to capture visual information of at least a portion of an object.

The example of FIG. 5A illustrates a top down view of an environment. The environment illustrated in the example of FIG. 5A comprises first camera module 502, second camera module 504, third camera module 506, object 308, and obstruction 510. In the example of FIG. 5A, camera modules 502, 504, and 506 may be similar as described regarding FIGS. 2A-2B. It can be seen that in the example of FIG. 5A, object 508 is a building comprising a main structure and two side chimneys adjacent to a plurality of trees. Even though object 508 is illustrated as a building in the example of FIG. 5A, it should be understood that an object 508 may be any object within a field of view of a camera module. It can be seen that in the example of FIG. 5A, obstruction 510 is a wall. Even though obstruction 510 is illustrated as a wall in the example of FIG. 5A, it should be understood that obstruction 510 may be any obstruction that obscures an object from the field of view of a camera module, such as another object, a geographical feature, and/or the like. It should be understood that in the example of FIG. 5A, camera module 502 may have a field of view similar as described regarding FIG. 3A, and that camera module 504 may have a field of view similar as described regarding FIG. 3B.

The example of FIG. 5B illustrates a view toward object 508 from the camera location of camera module 506 of FIG. 5A. It can be seen that in the example of FIG. 5B, the majority of object 508 is obscured from the view of example 5B by obstruction 510. In this manner, FIG. 5B may illustrate a field of view of camera module 506.

In some circumstances, it may be desirable to provide a user an indication of an object that is obscured from a particular location. For example, the object behind the obstruction may be selectable, the apparatus may have identified the object, the object may be represented in different camera information captured at a different camera location, and/or the like. In circumstances such as these, it may be desirable to cause display of an object indicator. An object indicator may refer to a graphical indicator that overlay camera information at a position correlating with the position of an object. For example, if an object is behind a wall, an object indicator may overlay a visual representation of the wall at the approximate location of the object behind the wall. A visual indicator may for example be a partially transparent indicator, a dashed outline of the object, a partially transparent indicator that extrapolates obstructed portions of an object, a representation generated from other camera information, a symbol, and/or the like. In this manner, a user may view the visual indicator and infer the location of the object represented by the object indicator, identify what the object is, and/or the like. For example, a user may view an object indicator and determine the object is selectable, determine the objects physical relationship with respect to other objects, and/or the like. In at least one example embodiment, an apparatus causes display of an object indicator that overlays camera information at a position correlating with a position of an object.

The example of FIG. 5C illustrates a view toward object 508 from the camera location of camera module 506 of FIG. 5A. It can be seen that in the example of FIG. 5C object 508 is obscured from the view of example 5C by obstruction 510. In this manner, FIG. 5C may illustrate a field of view of camera module 506. It can be seen that in the example of FIG. 5C, object indicator 512 overlays obstruction 510, at a position corresponding with object 508 of FIG. 5A. For example, an apparatus may have determined from camera information received from camera modules 502 and 504 of FIG. 5A (e.g. depth information, camera location information, etc.) that object 508 is located behind obstruction 510 from the location of camera module 506. In response the apparatus may have caused display of object indicator 512. In this manner, a user may view object indicator 512 and infer the location of object 508 is behind obstruction 512.

Figure 6:
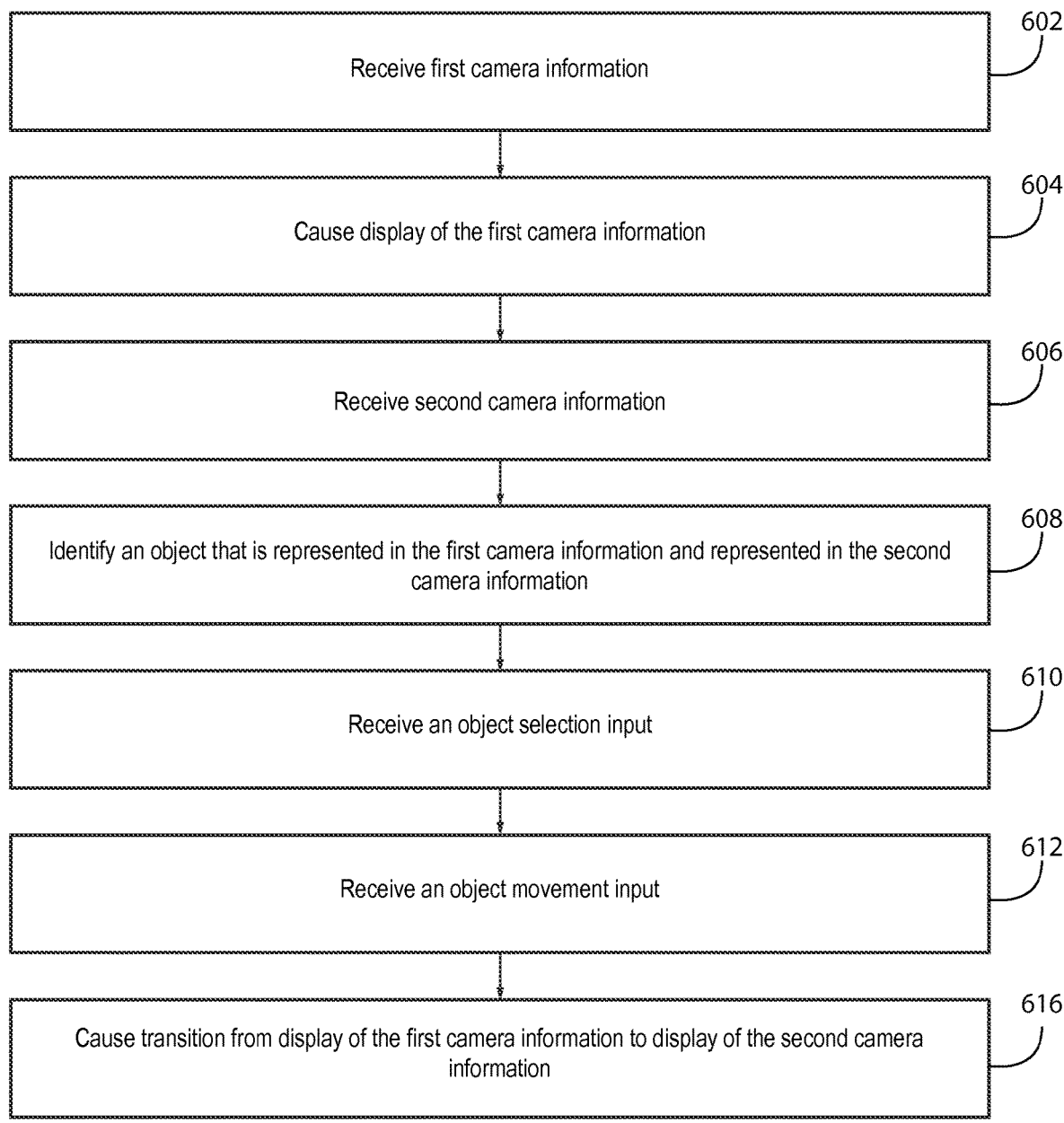
FIG. 6 is a flow diagram illustrating activities associated with transition from display of first camera information to display of second camera information according to at least one example embodiment.

FIG. 6 is a flow diagram illustrating activities associated with transition from display of first camera information to display of second camera information according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 6.

At block 602, the apparatus receives first camera information. In at least one example embodiment, the first camera information is indicative of visual information from a first camera location. The receipt, the camera information, the visual information, and the camera location may be similar as described regarding FIG. 1, FIGS. 2A-2B, FIGS. 3A-3E, FIGS. 4A-4B, and FIGS. 5A-5C.

At block 604, the apparatus causes display of the first camera information. The causation and the display may be similar as described regarding FIG. 1, FIGS. 2A-2B, FIGS. 3A-3E, FIGS. 4A-4B, and FIGS. 5A-5C.

At block 606, the apparatus receives second camera information. In at least one example embodiment, the second camera information is indicative of visual information from a second camera location. The receipt, the camera information, the visual information, and the camera location may be similar as described regarding FIG. 1, FIGS. 2A-2B, FIGS. 3A-3E, FIGS. 4A-4B, and FIGS. 5A-5C.

At block 608, the apparatus identifies an object that is represented in the first camera information and represented in the second camera information. The identification, the object, and the representation may be similar as described regarding FIGS. 3A-3E, FIGS. 4A-4B, and FIGS. 5A-5C.

At block 610, the apparatus receives an object selection input. In at least one example embodiment, the object selection input designates a representation of the object from the first camera information. The receipt, the object selection input, the designation, and the representation of the object may be similar as described regarding FIG. 1, FIGS. 3A-3E, FIGS. 4A-4B, and FIGS. 5A-5C.

At block 612, the apparatus receives an object movement input. In at least one example embodiment, the object movement input is indicative of movement in relation to the object. The receipt, the object movement input, and the relation to the object may be similar as described regarding FIG. 1, FIGS. 3A-3E, FIGS. 4A-4B, and FIGS. 5A-5C.

At block 616, the apparatus causes transition from display of the first camera information to display of the second camera information. In at least one example embodiment, the transition is based, at least in part, on a determination that a direction of the object movement input corresponds with a direction from the first camera location to the second camera location. The transition, the determination, and the directions may be similar as described regarding FIG. 1, FIGS. 3A-3E, FIGS. 4A-4B, and FIGS. 5A-5C.

Figure 7:
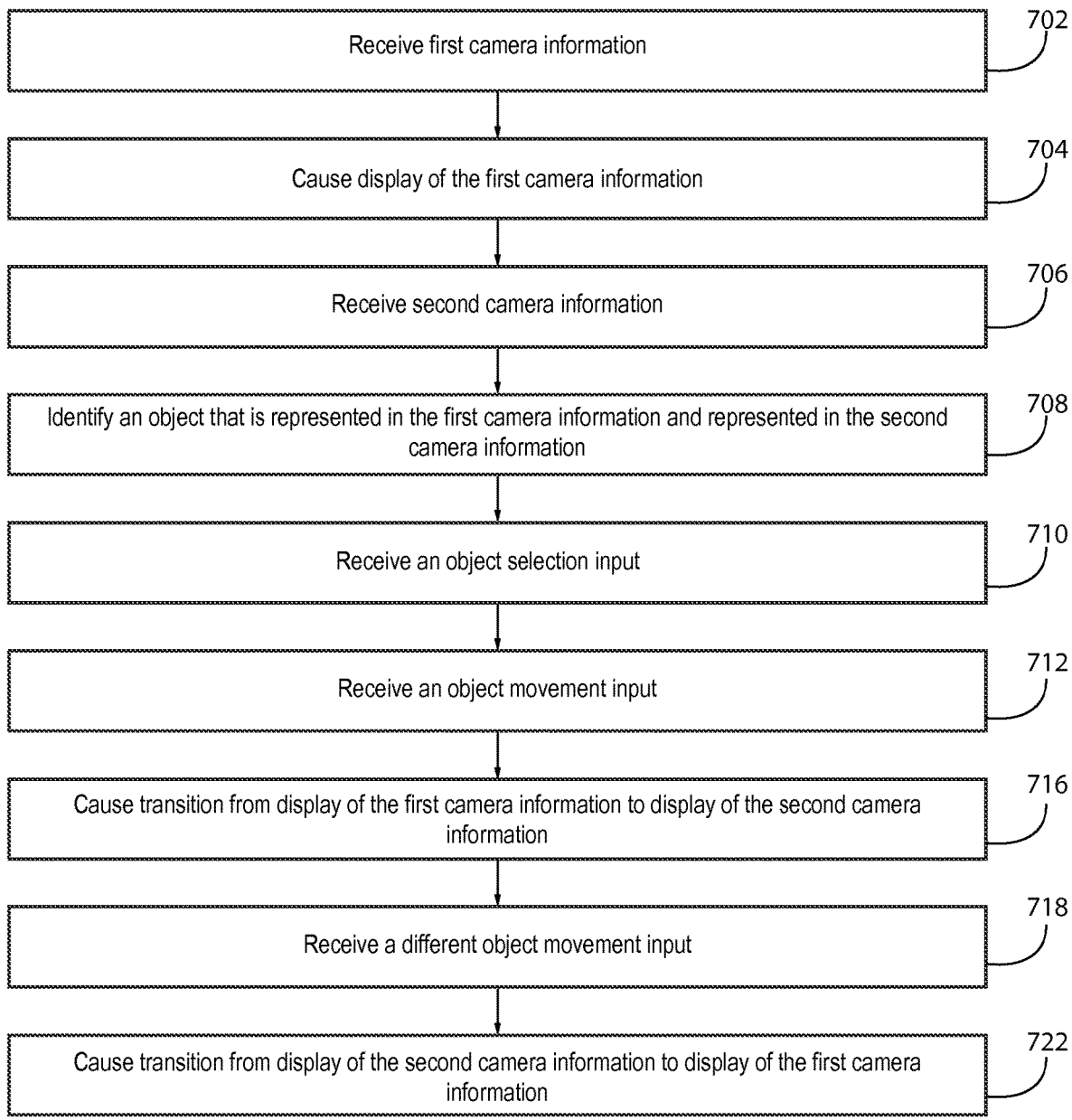
FIG. 7 is a flow diagram illustrating activities associated with transition from display of second camera information to display of first camera information according to at least one example embodiment according to at least one example embodiment.

FIG. 7 is a flow diagram illustrating activities associated with transition from display of second camera information to display of first camera information according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 7.

As previously described, in some circumstances an apparatus causes transition from display of first camera information to display of second camera information. In some circumstances, it may be desirable for an apparatus to cause transition from display of the second camera information to display of the first camera information. For example, a user may wish to resume viewing of the first camera information.

At block 702, the apparatus receives first camera information, similarly as described regarding block 602 of FIG. 6. At block 704, the apparatus causes display of the first camera information, similarly as described regarding block 604 of FIG. 6. At block 706, the apparatus receives second camera information, similarly as described regarding block 606 of FIG. 6. At block 708, the apparatus identifies an object that is represented in the first camera information and represented in the second camera information, similarly as described regarding block 608 of FIG. 6. At block 710, the apparatus receives an object selection input, similarly as described regarding block 610 of FIG. 6. At block 712, the apparatus receives an object movement input, similarly as described regarding block 612 of FIG. 6. At block 716, the apparatus causes transition from display of the first camera information to display of the second camera information, similarly as described regarding block 616 of FIG. 6.

At block 718, the apparatus receive a different object movement input. In at least one example embodiment, the different object movement input is indicative of movement in relation to the object. The receipt, the object movement input, and the relation to the object may be similar as described regarding FIG. 1, FIGS. 3A-3E, FIGS. 4A-4B, and FIGS. 5A-5C.

At block 722, the apparatus causes transition from display of the second camera information to display of the first camera information. In at least one example embodiment, the transition is based, at least in part, on a determination that a direction of the different object movement input is opposite to a direction from the second camera location to the first camera location. The transition, the determination, and the directions may be similar as described regarding FIG. 1, FIGS. 3A-3E, FIGS. 4A-4B, and FIGS. 5A-5C.

Figure 8:
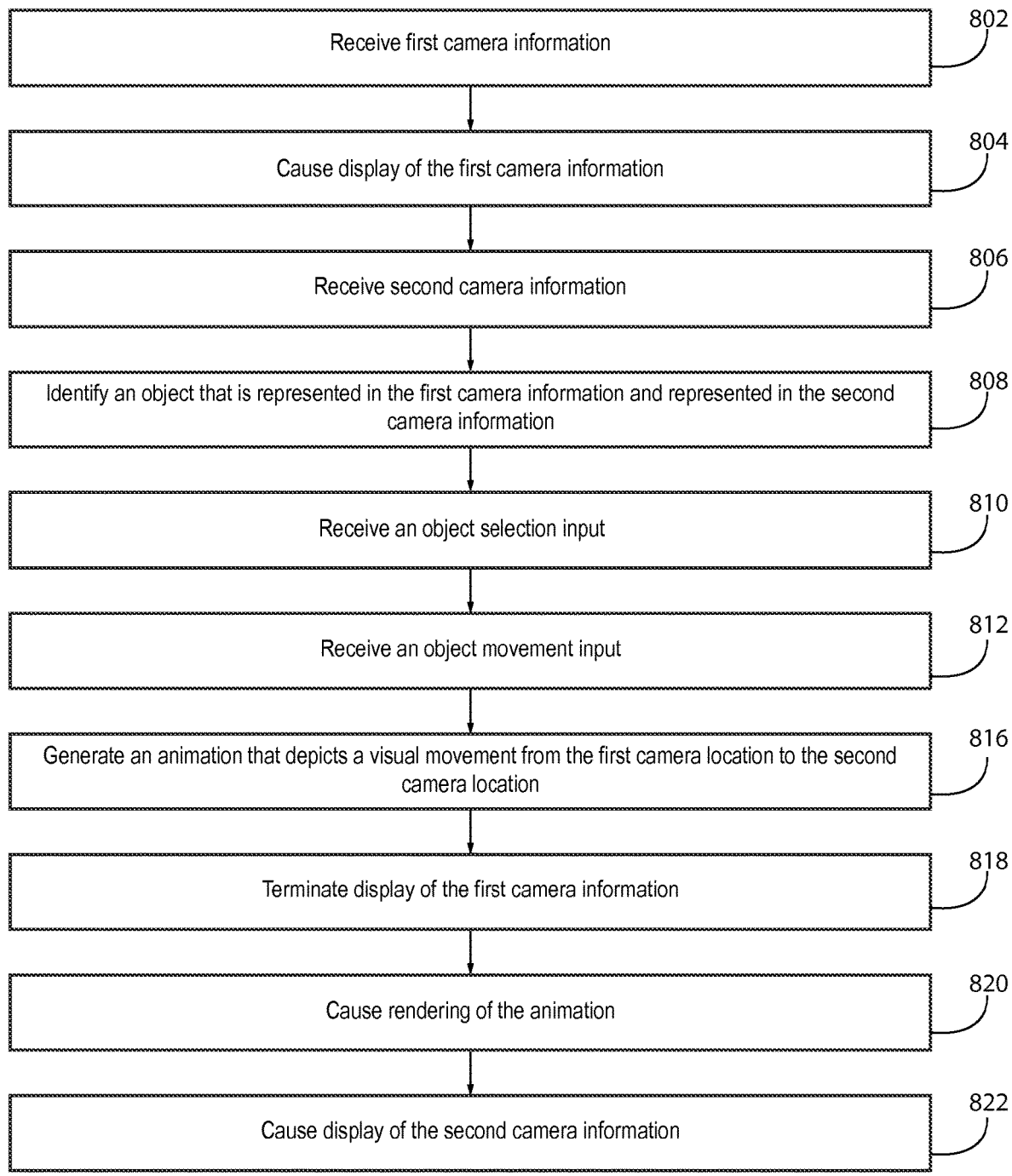
FIG. 8 is a flow diagram illustrating activities associated with rendering of an animation according to at least one example embodiment.

FIG. 8 is a flow diagram illustrating activities associated with rendering of an animation according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 8.

As previously described, in some circumstances an apparatus may transition from display of the first camera information to display of the second camera information. In some circumstances, such a transition may be disorienting, jerky, and/or the like. For example, the first camera information may differ significantly from the second camera information. For instance, the first camera information may comprise camera information captured from a different field of view angle than a field of view angle used to captures the second camera information.

In circumstances such as these, it may be desirable for the transition from display of the first camera information to display of the second camera information to comprise generation and rendering of an animation. For example, an animation may depict a visual movement from the first camera location to the second camera location. For instance, the animation may be generated by interpolating one or more intermediate views between the first camera information and the second camera information. For example, if the first camera information comprises a visual representation of the example of FIG. 3B, and the second camera information comprises a visual representation of the example of FIG. 3C, the animation may comprise a visual representation of the example of FIG. 3E, such that the visual representation of the example of FIG. 3E is intermediate to the visual representation of the example of FIG. 3B and the visual representation of the example of FIG. 3C. In this manner, the transition from display of the first camera information to display of the second camera information may have a smoother appearance, may be more aesthetically pleasing, may be less disorienting to the user, and/or the like.

As previously described, in some circumstances an apparatus may cause transition from display of first camera information to display of second camera information based on a determination that the direction of an object movement input corresponds with a direction from the first camera location to the second camera location. In some circumstances, it may be desirable to determine the speed of the object movement input. For example, it may be desirable to render the animation proportional to the speed of the object movement input. In at least one example embodiment, an apparatus determines a speed of an object movement input. For example, if the object movement input speed is rapid, the rendering of the animation may be rapid, and if the object movement input speed is slow, the animation may be slow. In this manner, the animation may approximately follow the object movement input. For example, the rendering of the animation may increase in speed, decrease in speed, pause, and/or the like in response to the object movement input. In at least one example embodiment, an apparatus determines a speed of an object movement input. In at least one example embodiment, the speed of the rendering of an animation is proportional to the speed of an object movement input.

At block 802, the apparatus receives first camera information, similarly as described regarding block 602 of FIG. 6. At block 804, the apparatus causes display of the first camera information, similarly as described regarding block 604 of FIG. 6. At block 806, the apparatus receives second camera information, similarly as described regarding block 606 of FIG. 6. At block 808, the apparatus identifies an object that is represented in the first camera information and represented in the second camera information, similarly as described regarding block 608 of FIG. 6. At block 810, the apparatus receives an object selection input, similarly as described regarding block 610 of FIG. 6. At block 812, the apparatus receives an object movement input, similarly as described regarding block 612 of FIG. 6.

At block 816, the apparatus generates an animation that depicts a visual movement from the first camera location to the second camera location. At block 818, the apparatus terminates display of the first camera information. At block 820, the apparatus causes rendering of the animation. In at least one example embodiment, the rendering is subsequent to termination of display of the first camera information.

At block 822, the apparatus causes display of the second camera information. In at least one example embodiment, the causation of display is subsequent to completion of the rendering of the animation. The causation and the display may be similar as described regarding FIG. 1, FIGS. 2A-2B, FIGS. 3A-3E, FIGS. 4A-4B, and FIGS. 5A-5C.

Figure 9:
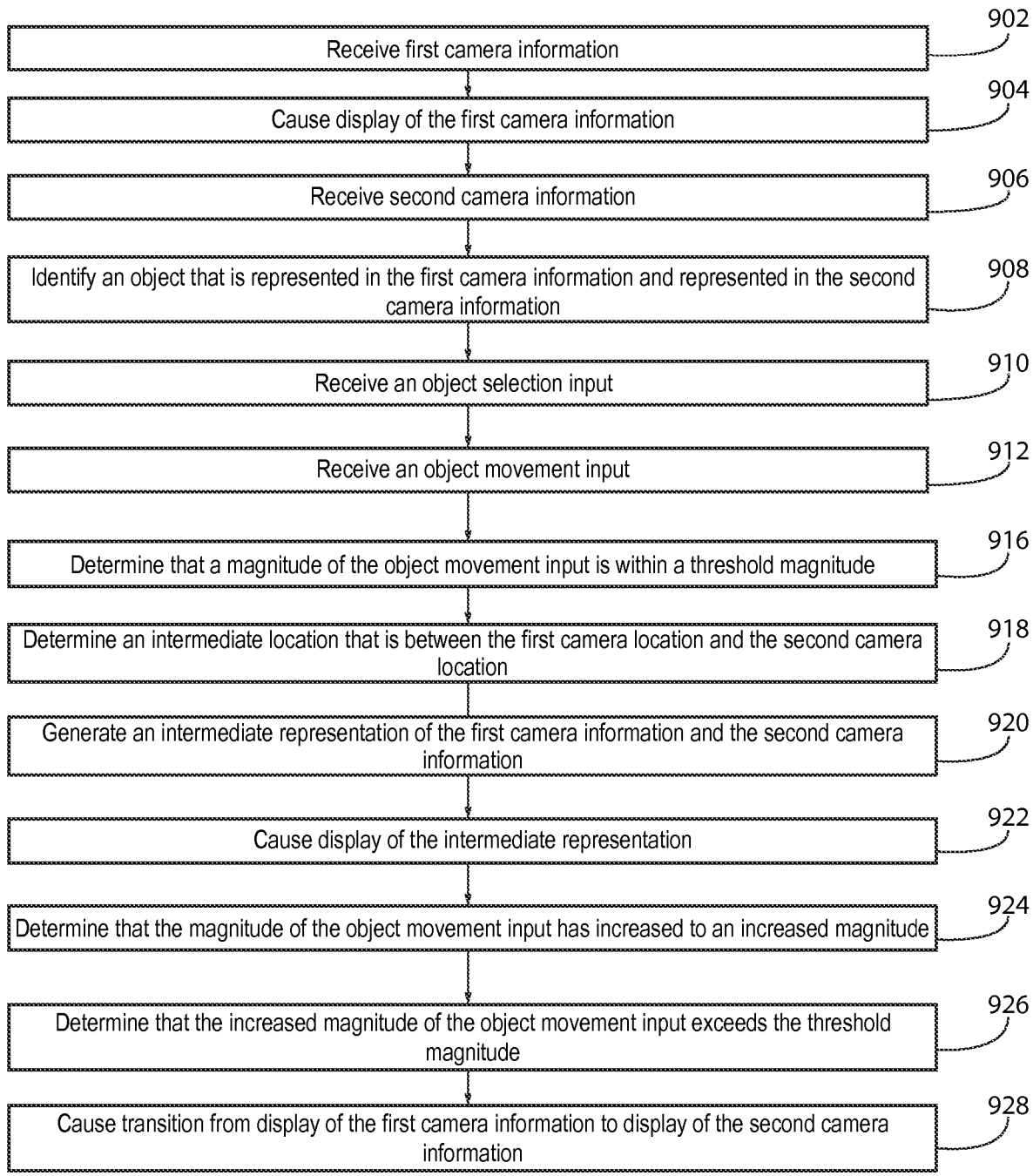
FIG. 9 is a flow diagram illustrating activities associated with generation of an intermediate representation of first camera information and second camera information according to at least one example embodiment.

FIG. 9 is a flow diagram illustrating activities associated with generation of an intermediate representation of first camera information and second camera information according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 9.

As previously described, in some circumstances, transition from display of first camera information to display of second camera information may be disorienting, jerky, and/or the like. In circumstances such as these, it may be desirable for the transition from display of the first camera information to display of the second camera information to comprise display one or more intermediate representations of the first camera information and the second camera information. An intermediate representation may refer to a representation that is representative of a view from an intermediate location between a first camera location and a second camera location, such that the intermediate representation is indicative of visual information that correlates to the intermediate location. For instance, an intermediate representation may be a previously generated image, an interpolated image, an image captured by a camera module that is no longer located at the intermediate location, and/or the like. For example, if the first camera information comprises a visual representation of the example of FIG. 3B, and the second camera information comprises a visual representation of the example of FIG. 3C, the intermediate representation may comprise a visual representation of the example of FIG. 3E. In this manner, the transition from display of the first camera information to display of the second camera information may have a smoother appearance, may be more aesthetically pleasing, may be less disorienting to the user, and/or the like. In at least one example embodiment, an apparatus causes display of an intermediate representation.

At block 902, the apparatus receives first camera information, similarly as described regarding block 602 of FIG. 6. At block 904, the apparatus causes display of the first camera information, similarly as described regarding block 604 of FIG. 6. At block 906, the apparatus receives second camera information, similarly as described regarding block 606 of FIG. 6. At block 908, the apparatus identifies an object that is represented in the first camera information and represented in the second camera information, similarly as described regarding block 608 of FIG. 6. At block 910, the apparatus receives an object selection input, similarly as described regarding block 610 of FIG. 6. At block 912, the apparatus receives an object movement input, similarly as described regarding block 612 of FIG. 6.

At block 916, the apparatus determines that a magnitude of the object movement input is within a threshold magnitude. The determination, the magnitude, and the threshold magnitude may be similar as described regarding FIGS. 3A-3E.

At block 918, the apparatus determines an intermediate location that is between the first camera location and the second camera location. In at least one example embodiment, determination of the intermediate location is based, at least in part, on the magnitude of the object movement input.

At block 920, the apparatus generates an intermediate representation of the first camera information and the second camera information. In at least one example embodiment, the intermediate representation is generated such that the intermediate representation is indicative of visual information that correlates to the intermediate location.

At block 922, the apparatus causes display of the intermediate representation. At block 924, the apparatus determines that the magnitude of the object movement input has increased to an increased magnitude. At block 926, the apparatus determines that the increased magnitude of the object movement input exceeds the threshold magnitude.

At block 928, the apparatus the apparatus causes transition from display of the first camera information to display of the second camera information, similarly as described regarding block 616 of FIG. 6. In at least one example embodiment, the transition from display of the first camera information to display of the second camera information is based, at least in part, on the determination that the increased magnitude of the object movement input exceeds the threshold magnitude.

Figure 10:
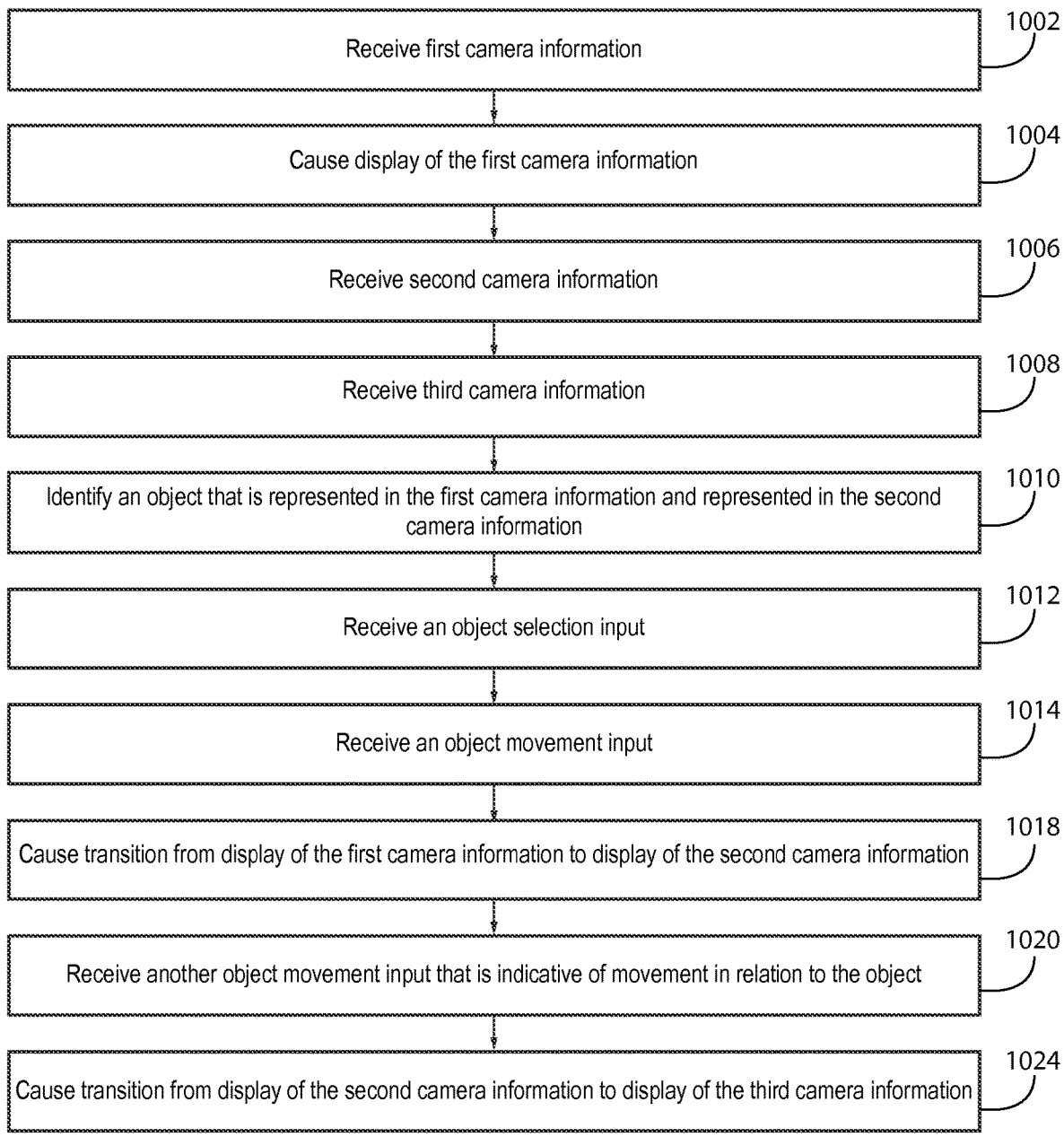
FIG. 10 is a flow diagram illustrating activities associated with transition from display of second camera information to display of third camera information according to at least one example embodiment.

FIG. 10 is a flow diagram illustrating activities associated with transition from display of second camera information to display of third camera information according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 10.

As previously described, in some circumstances a user may desire to transition from the display of first camera information to the display of second camera information. In some circumstances, third camera information may be available. For example, an apparatus may receive camera information indicative of visual information from the camera locations of cameras 302, 304, and 306 of FIG. 3A, cameras 502, 504, and 506 of FIG. 5A, and/or the like. In circumstances such as these, it may be desirable to cause transition from display of the first camera information to display of the third camera information, transition from display of the second camera information to display of the third camera information, transition from display of the third camera information to display of the first or second camera information, and/or the like.

At block 1002, the apparatus receives first camera information, similarly as described regarding block 602 of FIG. 6. At block 1004, the apparatus causes display of the first camera information, similarly as described regarding block 604 of FIG. 6. At block 1006, the apparatus receives second camera information, similarly as described regarding block 606 of FIG. 6.

At block 1008, the apparatus receives third camera information. In at least one example embodiment, the third camera information is indicative of visual information from a third camera location. The receipt, the camera, the camera information, the visual information, and the camera location may be similar as described regarding FIG. 1, FIGS. 2A-2B, FIGS. 3A-3E, FIGS. 4A-4B, and FIGS. 5A-5C.

At block 1010, the apparatus identifies an object that is represented in the first camera information and represented in the second camera information, similarly as described regarding block 608 of FIG. 6. At block 1012, the apparatus receives an object selection input, similarly as described regarding block 610 of FIG. 6. At block 1014, the apparatus receives an object movement input, similarly as described regarding block 612 of FIG. 6. At block 1018, the apparatus causes transition from display of the first camera information to display of the second camera information, similarly as described regarding block 616 of FIG. 6.

At block 1020, the apparatus receives another object movement input that is indicative of movement in relation to the object. In at least one example embodiment, the receipt of the other object movement input is subsequent to the transition from display of the first camera information to display of the second camera information. The receipt, the object movement input, and the relation to the object may be similar as described regarding FIG. 1, FIGS. 3A-3E, FIGS. 4A-4B, and FIGS. 5A-5C.

At block 1024, the apparatus causes transition from display of the second camera information to display of the third camera information. In at least one example embodiment, the causation of the transition is based, at least in part, on a determination that a direction of the object movement input corresponds with a direction from the second camera location to the third camera location. The transition, the determination, and the directions may be similar as described regarding FIG. 1, FIGS. 3A-3E, FIGS. 4A-4B, FIGS. 5A-5C, FIG. 8 and FIG. 9.

Figure 11:
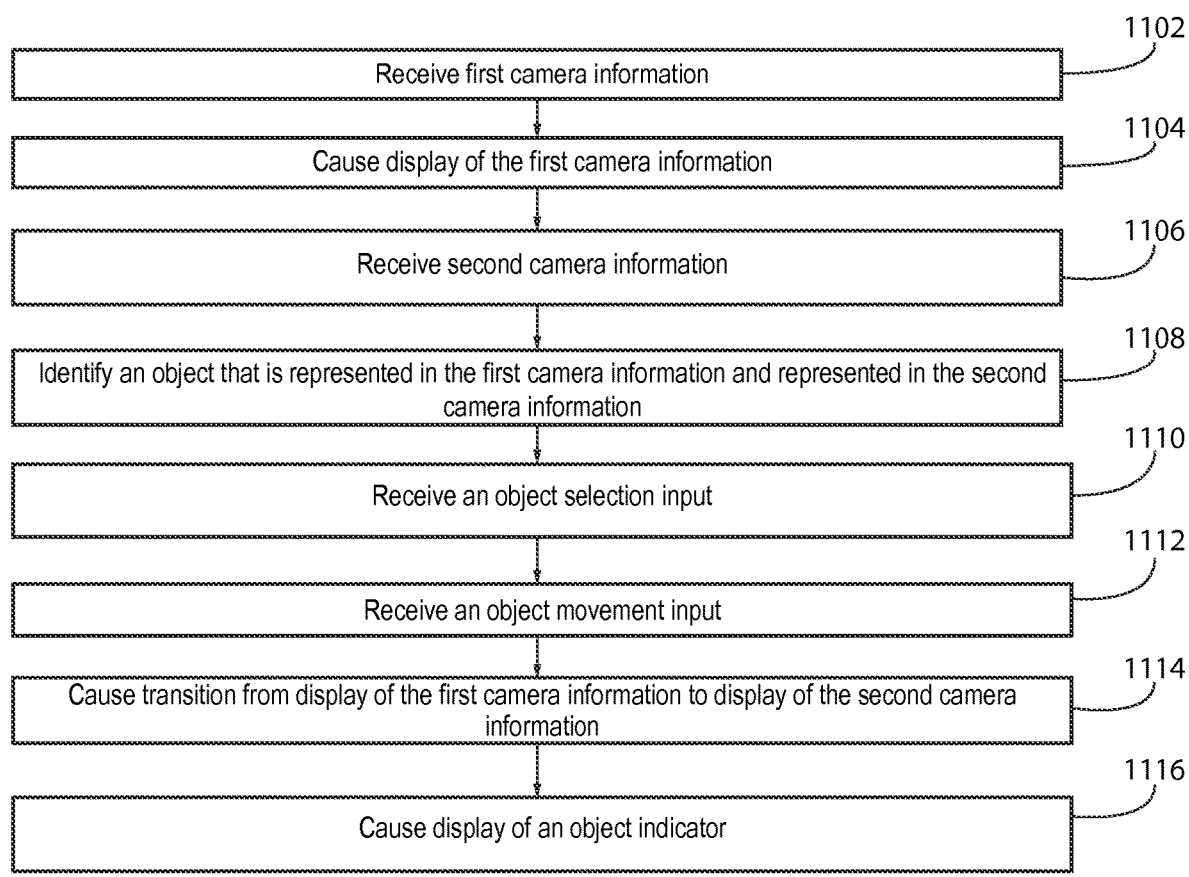
FIG. 11 is a flow diagram illustrating activities associated with display of an object indicator according to at least one example embodiment.

FIG. 11 is a flow diagram illustrating activities associated with display of an object emphasis indicator according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 11.

As previously described, in some circumstances an apparatus may cause display of an object emphasis indicator.

At block 1102, the apparatus receives first camera information, similarly as described regarding block 602 of FIG. 6. At block 1104, the apparatus causes display of the first camera information, similarly as described regarding block 604 of FIG. 6. At block 1106, the apparatus receives second camera information, similarly as described regarding block 606 of FIG. 6. At block 1108, the apparatus identifies an object that is represented in the first camera information and represented in the second camera information, similarly as described regarding block 608 of FIG. 6. At block 1110, the apparatus receives an object selection input, similarly as described regarding block 610 of FIG. 6. At block 1112, the apparatus receives an object movement input, similarly as described regarding block 612 of FIG. 6. At block 1114, the apparatus causes transition from display of the first camera information to display of the second camera information, similarly as described regarding block 616 of FIG. 6.

At block 1116, the apparatus causes display of an object indicator. In at least one example embodiment, the object indicator overlays the second camera information at a position correlating with a position of the object. The object indictor, the overlay, and the position may be similar as described regarding FIGS. 5A-5C.

Figure 12:
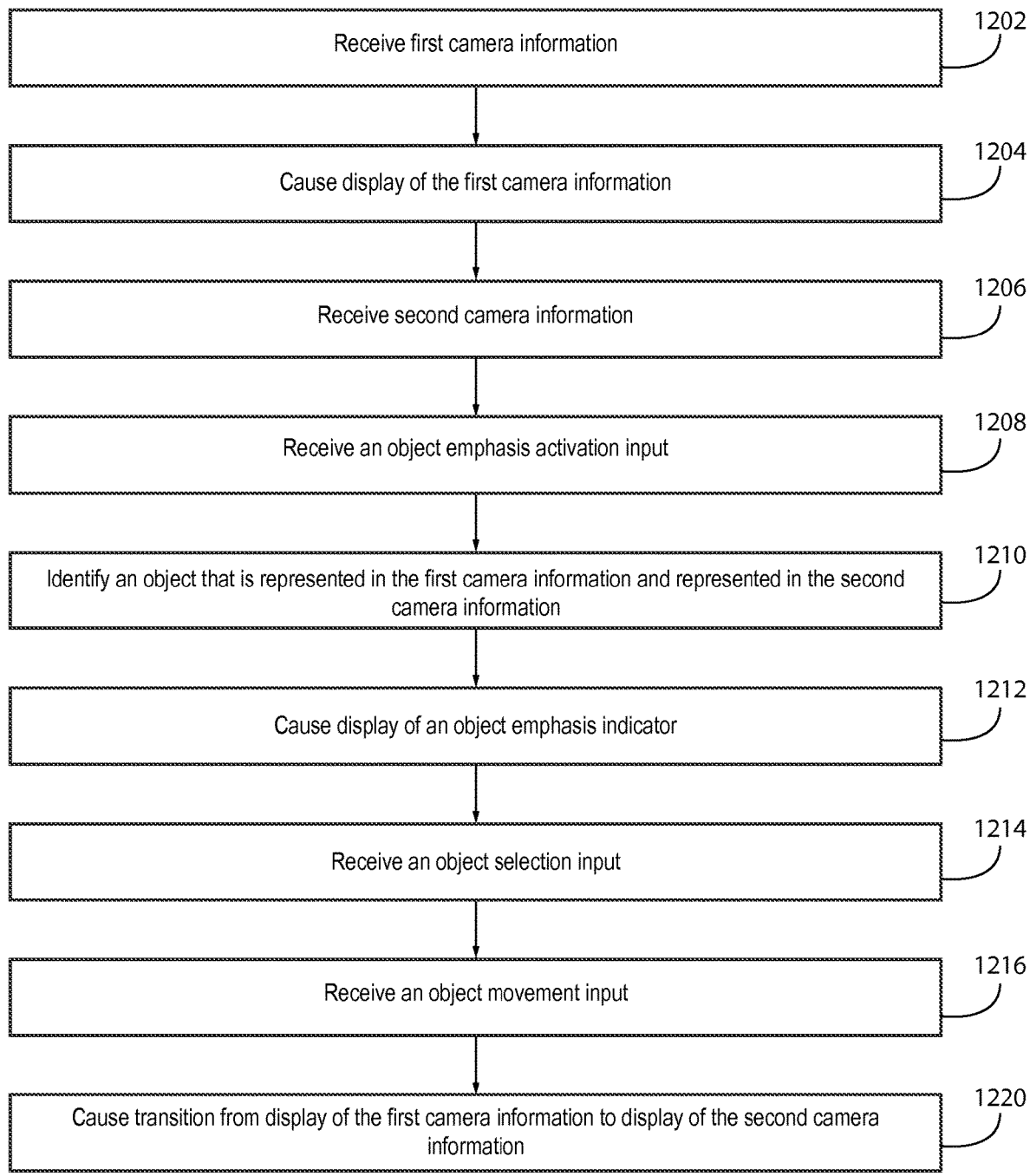
FIG. 12 is a flow diagram illustrating activities associated with display of an object emphasis indicator according to at least one example embodiment.

FIG. 12 is a flow diagram illustrating activities associated with display of an object emphasis indicator according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform the set of operations of FIG. 12.

As previously described, in some circumstances an apparatus may cause display of an object emphasis indicator.

At block 1202, the apparatus receives first camera information, similarly as described regarding block 602 of FIG. 6. At block 1204, the apparatus causes display of the first camera information, similarly as described regarding block 604 of FIG. 6. At block 1206, the apparatus receives second camera information, similarly as described regarding block 606 of FIG. 6.

At block 1208, the apparatus receive an object emphasis activation input. In at least one example embodiment, the object emphasis input enables emphasis of the object. The receipt and the object emphasis input may be similar as described regarding FIG. 1 and FIGS. 4A-4B. At block 1210, the apparatus identifies an object that is represented in the first camera information and represented in the second camera information, similarly as described regarding block 608 of FIG. 6.

At block 1212, the apparatus causes display of an object emphasis indicator. In at least one example embodiment, the object emphasis indicator is displayed such that the object emphasis indicator aligns with the representation of the object. In at least one example embodiment, the causation of display of the object emphasis indicator is in response to the identification of the object. In at least one example embodiment, the causation of display of the object emphasis indicator is based, at least in part, on the receipt of the object emphasis activation input. The display, the object emphasis indicator, and the alignment may be similar as described regarding FIGS. 4A-4B.

At block 1214, the apparatus receives an object selection input, similarly as described regarding block 610 of FIG. 6. At block 1216, the apparatus receives an object movement input, similarly as described regarding block 612 of FIG. 6. At block 1220, the apparatus causes transition from display of the first camera information to display of the second camera information, similarly as described regarding block 616 of FIG. 6.

One or more example embodiments may be implemented in software, hardware, application logic or a combination of software, hardware, and application logic. The software, application logic, and/or hardware may reside on the apparatus, a separate device, or a plurality of separate devices. If desired, part of the software, application logic, and/or hardware may reside on the apparatus, part of the software, application logic and/or hardware may reside on a separate device, and part of the software, application logic, and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 604 of FIG. 6 may be performed after block 606 of FIG. 6. Furthermore, if desired, one or more of the above-described functions may be optional or may be combined. For example, block 606 of FIG. 6 may be optional and/or combined with block 602 of FIG. 6.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

What is claimed is:

1. A method comprising:
receiving first camera information that is indicative of visual information from a first camera location;
causing display of the first camera information;
receiving second camera information that is indicative of visual information from a second camera location;
identifying an object that is represented in the first camera information and represented in the second camera information;
receiving an object selection input that designates a representation of the object from the first camera information;
receiving an object movement input that is indicative of movement of the object in relation to a reference point; and
causing transition from display of the first camera information to display of the second camera information based, at least partially, on the receipt of the object movement input.

2. The method of claim 1, further comprising determining that a direction of the object movement input is opposite to a direction from the first camera location to the second camera location, wherein the causation of transition from display of the first camera information to display of the second camera information is based, at least partially, on the determination that the direction of the object movement input corresponds with the direction from the first camera location to the second camera location.

3. The method of claim 1, further comprising:
receiving a different object movement input that is indicative of movement in relation to the object; and
causing transition from display of the second camera information to display of the first camera information based, at least partially, on the receipt of the different object movement input.

4. The method of claim 3, wherein the transition from display of the first camera information to display of the second camera information causes deselection of the object, and further comprising receiving a different object selection input that designates a representation of the object from the second camera information.

5. The method of claim 1, wherein the transition from display of the first camera information to display of the second camera information comprises:
generating an animation that depicts a visual movement from the first camera location to the second camera location;
terminating display of the first camera information;
causing rendering of the animation subsequent to termination of display of the first camera information; and
causing display of the second camera information subsequent to completion of the rendering of the animation.

6. The method of claim 1, further comprising determining that a magnitude of the object movement input exceeds a threshold magnitude, wherein the transition from display of the first camera information to display of the second camera information is based, at least partially, on the determination that the magnitude of the object movement input exceeds the threshold magnitude.

7. The method of claim 1, further comprising:
determining that a magnitude of the object movement input is within a threshold magnitude;
determining an intermediate location that is between the first camera location and the second camera location based, at least partially, on the magnitude of the object movement input;
generating an intermediate representation of the first camera information and the second camera information, such that the intermediate representation is indicative of visual information that correlates to the intermediate location;
causing display of the intermediate representation;
determining that the magnitude of the object movement input has increased to an increased magnitude; and
determining that the increased magnitude of the object movement input exceeds the threshold magnitude, wherein the transition from display of the first camera information to display of the second camera information is based, at least partially, on the determination that the increased magnitude of the object movement input exceeds the threshold magnitude.

8. The method of claim 7, wherein the object movement input comprises a pause portion and a continuation portion, the pause portion being prior to the determination that the magnitude of the object movement input is within the threshold magnitude, and the continuation portion causing the determination that the magnitude of the object movement input has increased to the increased magnitude.

9. The method of claim 1, further comprising:
receiving third camera information that is indicative of visual information from a third camera location;
subsequent to the transition from display of the first camera information to display of the second camera information, receiving another object movement input that is indicative of movement in relation to the object; and
causing transition from display of the second camera information to display of the third camera information based, at least partially, on the receipt of the object movement input.

10. The method of claim 1, further comprising, in response to the identification of the object, causing display of an object emphasis indicator such that the object emphasis indicator aligns with the representation of the object.

11. The method of claim 1, wherein the causation of transition from display of the first camera information to display of the second camera information comprises continuation of display of a portion of the first camera information such that the portion of the first camera information and at least a portion of the second camera information that comprises a representation of the object are displayed simultaneously.

12. An apparatus comprising:
at least one processor; and
at least one non-transitory memory including computer program code
the at least one memory and the computer program code configured to, with the at least one processor, cause the apparatus to perform at least the following:
receive first camera information that is indicative of visual information from a first camera location;
cause display of the first camera information;
receive second camera information that is indicative of visual information from a second camera location;
identify an object that is represented in the first camera information and represented in the second camera information;
receive an object selection input that designates a representation of the object from the first camera information;
receive an object movement input that is indicative of movement of the object in relation to a reference point; and
cause transition from display of the first camera information to display of the second camera information based, at least partially, on the receipt of the object movement input.

13. At least one non-transitory computer readable medium comprising instructions that, when executed, perform the method of claim 1.

14. The method of claim 1, wherein a perspective of the object as represented in the second camera information is different from a perspective of the object as represented in the first camera information according to the movement of the object indicated with the object movement input.

* * * * *